United States Patent
Berggren et al.

(10) Patent No.: US 12,414,078 B2
(45) Date of Patent: Sep. 9, 2025

(54) PAGING OF MULTI-SIM WIRELESS COMMUNICATION DEVICES

(71) Applicant: Sony Group Corporation, Tokyo (JP)

(72) Inventors: Anders Berggren, Lund (SE); Anders Mellqvist, Lund (SE); Svante Alnås, Lund (SE); Johan Hill, Lund (SE); Torgny Palenius, Barsebäck (SE)

(73) Assignee: Sony Group Corporation, Tokyo (JP)

( * ) Notice: Subject to any disclaimer, the term of this patent is extended or adjusted under 35 U.S.C. 154(b) by 716 days.

(21) Appl. No.: 17/770,013

(22) PCT Filed: Oct. 23, 2020

(86) PCT No.: PCT/EP2020/079898
§ 371 (c)(1),
(2) Date: Apr. 18, 2022

(87) PCT Pub. No.: WO2021/083801
PCT Pub. Date: May 6, 2021

(65) Prior Publication Data
US 2022/0394667 A1    Dec. 8, 2022

(30) Foreign Application Priority Data
Oct. 31, 2019 (SE) .................................. 1930354-4

(51) Int. Cl.
*H04W 68/02* (2009.01)
*H04W 68/00* (2009.01)
(Continued)

(52) U.S. Cl.
CPC ......... *H04W 68/02* (2013.01); *H04W 68/005* (2013.01); *H04W 68/12* (2013.01); *H04W 52/0216* (2013.01); *H04W 88/06* (2013.01)

(58) Field of Classification Search
CPC ... H04W 68/02; H04W 68/005; H04W 68/12; H04W 52/0216; H04W 88/06; H04W 76/16; H04W 76/27; Y02D 30/70
See application file for complete search history.

(56) References Cited

U.S. PATENT DOCUMENTS 9,408,183 B2 *  8/2016  Chirayil ................ H04W 68/02
2009/0215472 A1  8/2009  Hsu
(Continued)

FOREIGN PATENT DOCUMENTS

CN    101521935 A    9/2009
CN    102282898 A    12/2011
(Continued)

OTHER PUBLICATIONS

Avoidance of paging collisions to minimize outage of services, 3GPP TSG SA WG2 #122 S2-174243, Jun. 20, 2017.
(Continued)

*Primary Examiner* — Kabir A Timory
(74) *Attorney, Agent, or Firm* — Tucker Ellis LLP

(57) ABSTRACT

A method of operating a wireless communication device (101) comprising a wireless interface (1015) having a capability to use a first identity (451) and a second identity (452), the method comprising: determining a timing offset between a first timing of first paging occasions (396, 396-1) of a first network (100, 100-1) associated with the first identity (451) and a second timing of second paging occasions (396, 396-2) of a second network (100, 100-2) associated with the second identity (452); and based on the timing offset (780, 780-1), transmitting at least one request control message (3002) to at least one of the first network (100, 100-1) or the second network (100, 100-2), to request a timing coordination of paging from the first network (100, 100-2) and paging from the second network (100, 100-2).

18 Claims, 14 Drawing Sheets

(51) Int. Cl.
  *H04W 68/12* (2009.01)
  *H04W 52/02* (2009.01)
  *H04W 88/06* (2009.01)

(56) References Cited

U.S. PATENT DOCUMENTS

| | | |
|---|---|---|
| 2009/0215473 A1 | 8/2009 | Hsu |
| 2011/0244880 A1 | 10/2011 | Chin |
| 2012/0027003 A1 | 2/2012 | Chin et al. |
| 2012/0088501 A1 | 4/2012 | Chin |
| 2012/0088502 A1 | 4/2012 | Chin |
| 2015/0017982 A1 | 1/2015 | Klatt |
| 2015/0131543 A1 | 5/2015 | Huo |
| 2016/0381710 A1 | 12/2016 | Bansal |
| 2018/0077728 A1 | 3/2018 | Shi |
| 2018/0220329 A1 | 8/2018 | Arumugam |
| 2018/0343638 A1* | 11/2018 | Balasubramanian .................... H04W 74/0825 |
| 2021/0037465 A1* | 2/2021 | Mazloum ............ H04W 68/005 |

FOREIGN PATENT DOCUMENTS

| | | |
|---|---|---|
| CN | 103167474 A | 6/2013 |
| CN | 103250438 A | 8/2013 |
| CN | 109479257 A | 3/2019 |
| EP | 2737762 A1 | 6/2014 |
| WO | 2013124046 A1 | 8/2013 |
| WO | 2018161244 A1 | 9/2018 |
| WO | 2018176219 A1 | 10/2018 |
| WO | 2020178483 A1 | 9/2020 |

OTHER PUBLICATIONS

International Search Report from and Written Opinion from corresponding International Application No. PCT/EP2020/079898, mailed on Feb. 16, 2021, 10 pages.
Office Action and Search Report from corresponding Swedish Application No. 1930354-4, mailed on Sep. 24, 2020, 9 pages.
Qualcomm Incorporated, et al., "Solution for paging collision avoidance," 3rd Generation Partnership Project (3GPP) SA WG2 Meeting #135, Oct. 14-18, 2019, Croatia, S2-1909937, 4 pages.
VIVO, "Report of phase 1 Multi-SIM email discussion", 3GPP tsg_ran\tsg_ran,tsgr_85 Sep. 16, 2019, RP-191898.

* cited by examiner

PAGING OF MULTI-SIM WIRELESS COMMUNICATION DEVICES

TECHNICAL FIELD

Various examples of the invention generally relate to paging wireless communication devices capable of connecting to at least one communication network using multiple identities. Various examples specifically relate to coordinating paging in time domain.

BACKGROUND

Mobile communication using wireless communication devices is widespread. Some wireless communication devices (user equipment, UE) are capable of connecting to at least one communication network using multiple identities. Such UEs can have, e.g., multiple subscriber identity modules (SIMs), e.g., Universal SIMs (USIMs). Hence, sometimes, these UEs are capable of connecting to at least one communication network using multiple identities are referred to multi-SIM UEs. In some implementations the SIM includes both hardware and software (user subscriber identity). A Universal Integrated Circuit Card (UICC) includes hardware (e.g., a chip card) and the USIM that is the software representing the subscriber identity module. A UICC could include multiple USIMs. IIT would also be possible that the USIM is stored on various hardware like embedded trusted platform or eSIM.

A multi-SIM UE can typically operate in different modes towards the different networks, using the multiple identities. A situation can occur in which the multi-SIM UE operates in an idle mode towards multiple networks. In the idle mode, the multi-SIM UE is configured to monitor for paging signals from the multiple networks at respective paging occasions (POs). A timing of the PO is typically dependent on the identity used for registering at the respective network.

It has been observed that the power consumption of multi-SIM UEs operating in the idle mode towards multiple networks can be significant. Because the idle mode is typically activated to reduce the power consumption, this can pose a significant drawback.

SUMMARY

Accordingly, there is a need for advanced techniques of operating multi-SIM UEs in the idle mode towards multiple networks. In particular, there is a need for techniques that facilitate low power consumption at the multi-SIM UE.

This need is met by the features of the independent claims. The features of the dependent claims define embodiments.

According to various examples, techniques are provided to coordinate paging in a multi-SIM UE with several subscriptions associated with multiple identities. The multi-SIM UE may request a network (NW) to move or align, in time-domain, the POs for the multiple identities to be overlapping or almost overlapping in time domain. If the request is approved by the NW, the multi-SIM UE can save power by decreasing the time periods when it will monitor for paging signals; also, the multi-SIM UE may be required to less frequently transition the wireless interface from an inactive state to an active state (wake-up) required for monitoring for the paging signals. The multi-SIM UE can monitor for the paging signals from different NWs in a coordinated manner, e.g., contemporaneously or with a well-defined, comparably short timing offset.

A method of operating a UE including a wireless interface is provided. The wireless interface has a capability to use a first identity and a second identity. The method includes determining a timing offset. The timing offset is between a first timing and a second timing. The first timing is of first paging occasions of the first network and is associated with the first identity. The second timing is of second paging occasions of a second network and is associated with the second identity. The method also includes transmitting at least one request control message to at least one of the first network or the second network, based on the timing offset. Thereby, a timing coordination of paging from the first network and the second network is requested.

A computer program or a computer-program product includes program code. The program code can be executed by at least one processor. Executing the program code can cause the at least one processor to perform a method of operating a UE including a wireless interface. The wireless interface has a capability to use a first identity and a second identity. The method includes determining a timing offset. The timing offset is between a first timing and a second timing. The first timing is of first paging occasions of the first network and is associated with the first identity. The second timing is of second paging occasions of a second network and is associated with the second identity. The method also includes transmitting at least one request control message to at least one of the first network or the second network, based on the timing offset. Thereby, a timing coordination of paging from the first network and the second network is requested.

A UE includes a wireless interface. The wireless interface has a capability to use a first identity and a second identity. The UE also includes a control circuitry. The control circuitry is configured to determine a timing offset. The timing offset is between a first timing and a second timing. The first timing is of first paging occasions of the first network and is associated with the first identity. The second timing is of second paging occasions of a second network and is associated with the second identity. The control circuitry is further configured to transmit at least one request control message, based on the timing offset. The at least one request control message is transmitted to the first network and/or to the second network. Thereby, a timing coordination of paging from the first network and the second network is requested.

A method of operating a network node of a second network is provided. The method includes receiving at least one request control message from a UE. Thereby, a coordination of paging from a first network and the second network is requested. The at least one request control message is associated with a timing offset between a first timing and a second timing. The first timing is of first paging occasions of the first network and is associated with the first identity of the UE. The second timing is of second paging occasions of the second network and is associated with a second identity of the UE. The method also includes selectively transmitting at least one response control message associated with the at least one request control message to the UE. The at least one response control message grants of further timing of further paging occasions of the second network. The further timing is coordinated with the first timing.

A computer program or a computer-program product includes program code. The program code can be executed by at least one processor. Executing the program code can cause the at least one processor to perform a method of operating a network node of a second network. The method includes receiving at least one request control message from a UE. Thereby, a coordination of paging from a first network and the second network is requested. The at least one request control message is associated with a timing offset between a first timing and a second timing. The first timing is of first paging occasions of the first network and is associated with the first identity of the UE. The second timing is of second paging occasions of the second network and is associated with a second identity of the UE. The method also includes selectively transmitting at least one response control message associated with the at least one request control message to the UE. The at least one response control message grants of further timing of further paging occasions of the second network. The further timing is coordinated with the first timing.

A network node of a second network includes control circuitry. The control circuitry is configured to receive at least one request control message from a UE. Thereby, a coordination of paging from a first network and the second network is requested. The at least one request control message is associated with the timing offset between a first timing of first paging occasions of the first network and associated with a first identity of the UE, and a second timing of second paging occasions of the second network associated with the second identity of the UE. The control circuitry is also configured to selectively transmit at least one response control message. The at least one response control message is associated with the at least one request control message. The at least one response control message is selectively transmitted to the UE. The at least one response control message grants a further timing of further paging occasions of the second network. The further timing is coordinated with the first timing.

A method of operating a UE including a wireless interface is provided. The wireless interface has the capability to use a first identity and a second identity. The method includes determining a timing offset between a first timing of first ON durations of a first discontinuous reception (DRX) cycle of the first NW associated with the first identity and a second timing of second ON durations of a second DRX cycle of a second NW associated with a second identity. Based on the timing offset, at least one request control message is transmitted to the at least one of the first NW or the second NW. Thereby, a timing coordination of the DRX cycles of the first NW and the second NW is requested.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
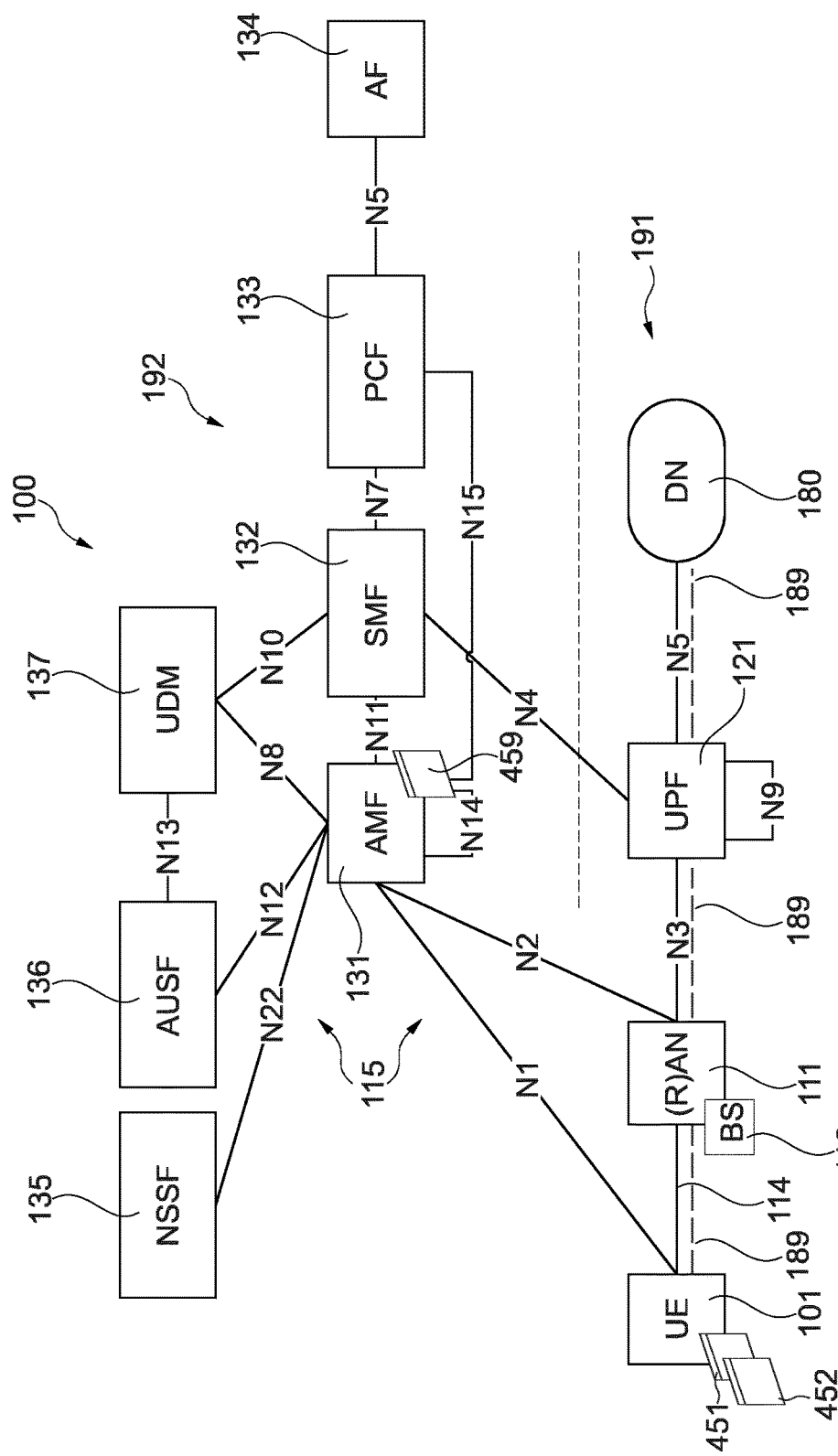
FIG. 1 schematically illustrates a cellular NW to which a multi-SIM UE is connectable according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various aspects relate to a communication system. For example, the communication system may be implemented by a UE and an access node of a communication NW. For example, the access node may be implemented by a base station (BS) of a cellular NW. Hereinafter, for sake of simplicity various examples will be described in connection with an implementation of the communication system by a UE connectable to a cellular NW. However, similar techniques may be readily employed for other kinds and types of communication systems.

The communication system may include a wireless link between the UE and the BS. Downlink (DL) signals may be transmitted by the BS and received by the UE. Uplink (UL) signals may be transmitted by the UE and received by the BS.

Various examples described herein relate to UEs that are capable of connecting to at least one cellular NW using two or more identities of the UE.

As a general rule, the term identity of the UE as used herein may refer to an identity associated with a subscriber associated with the UE, i.e., a subscriber identity. The identity may include a temporary identity assigned to the UE. For example, such UEs capable of connecting to the at least one cellular NW using two or more identities could comprise multiple SIM chip cards or embedded SIMs. Hereinafter, such UEs that are capable of connecting to the at least one cellular NW using multiple identities will be referred to as multi-SIM UEs. The different identities of a multi-SIM UE are typically associated with different subscriptions at respective cellular NWs. Such subscriptions are associated with a unique identity, e.g., the International Mobile Subscriber Identity (IMSI), and a unique service agreement. For example, policies and charging and/or traffic shaping for telephone calls, short messaging services and packet data or other services can be dependent on the respective service model. As a general rule, if the multi-SIM UE connects to at least one cellular NW using a first identity, then a respective IP address, a unique mobile station international subscriber directory number (MSISDN), and a unique data connection with the cellular NW can be provisioned. These parameters can be different if the multi-SIM UE connects to the same at least one cellular NW using a second identity that is different from the first identity. Hence, it can be said that a multi-SIM UE, from a NW perspective, will be perceived as two independent UEs.

As a general rule, multi-SIM UEs can connect to the same cellular NW or to multiple cellular NWs using their multiple identities. For instance, some scenarios are described herein in which a multi-SIM UE connects to multiple cellular NWs; but the techniques may also be applicable to scenarios in which the multi-SIM UE connects to one and the same cellular NW using the multiple identities.

As a general rule, it is optional that multi-SIM UEs have a communication interface having dual transmission capability. In particular, multi-SIM UEs to do not have dual transmit and/or receive (transmission) capability are sometimes called "single radio". Transmission of signals can include transmitting signals and/or receiving signals. Then, to be able to communicate with multiple cellular NWs, time multiplexing is employed. Multi-SIM UEs that have dual transmission capability are sometimes called "multi radio". Such multi-radio multi-SIM UEs can contemporaneously transmit and/or receive, e.g., on multiple frequencies. Thus, frequency multiplexing is possible. The techniques described herein are generally applicable to, both, single-radio multi-SIM UEs, as well as multi-radio multi-SIM UEs.

Various techniques are based on the finding that operation of multi-SIM UEs using multiple identities can have an impact on paging. According to various examples described herein, an optimized paging can be implemented for multi-SIM UEs.

According to various techniques, a timing coordination of paging from the multiple cellular NWs can be implemented. For this, the multi-SIM UE can determine a timing offset between (i) a first timing of first POs of a first cellular NW associated with a first identity, and (ii) a second timing of second POs of a second cellular NW associated with a second identity.

As a general rule, the timing offset may be zero or may be larger than zero, e.g., larger than a predefined lower threshold. In latter case, the first POs and the second POs may be non-overlapping in time domain, but rather offset from each other.

Then, based on this timing offset, at least one request control message can be transmitted to the first cellular NW and/or the second cellular NW, to request the timing coordination.

Upon receiving the at least one request control message, a NW node—e.g., a BS or a mobility-control node of a core of the respective cellular NW— of the first cellular NW and/or the second cellular NW can grant or not grant a further timing of further POs of the second cellular NW. Then, the multi-SIM UE can monitor for paging signals from the second cellular NW on the further POs in accordance with the further timing (instead of on the second POs in accordance with the second timing). The first timing of the first POs and the further timing of the further POs is thus coordinated in time domain.

As a general rule, it would be possible that the timing coordination results in a reduction of the timing offset or in an increase in the timing offset. In other words, it would be possible that a further timing offset between the first timing of the first POs and the further timing of the further POs is dimensioned smaller or larger than the timing offset between the first timing and the second timing.

Various techniques described herein are based on the finding that when operating a multi-SIM UE— in particular in an idle mode comprising paging—the power consumption will be affected when using reference techniques. By using the techniques described above, i.e., by coordinating the paging of the multiple cellular NWs, it becomes possible to reduce the energy consumption at the UE. For example, a time duration during which the multi-SIM UE is required to operate a modem of its wireless interface in an active state can be reduced, due to the coordination of the paging. Alternatively or additionally, it may be required less often to transition the modem from an inactive state to the active state; such a power-up of the modem is typically associated with a significant energy consumption. Then, by requiring the transition from the inactive state to the active state less often, the energy consumption can be reduced. Such a scenario may, in particular, be achieved when the further timing offset is smaller than the timing offset between the first timing of the first POs and the second timing of the second POs.

Various techniques described herein are based on the finding that when operating a multi-SIM UE in particular in the idle mode comprising paging the hardware capability can impose constraints on paging. In particular, a scenario can occur in which the first POs and the second POs of the first cellular NW and the second cellular NW are overlapping. For example, if a single-radio multi-SIM UE is used, it may be required to adjust a frequency of radio-frequency filters of a modem of a wireless interface of the UE in between the first timing of the first POs and the second timing of the second POs. Typically, a tuning rate of such radio-frequency filters is limited. Then, a full or partial overlap between the first timing and the second timing can limit the ability of the multi-SIM UE to monitor for paging signals from the first cellular NW, as well as from the second cellular NW. such limitations imposed by the hardware capability of the multi-SIM UE can be mitigated by requesting the coordination of the paging. In particular, the limitations of the hardware capability can be mitigated when the further timing offset is larger than the timing offset between the first timing of the first POs and the second timing of the second POs. Then, sufficient time may be provided to tune the radio-frequency filters between the first timing of the first POs and the further timing of the further POs.

Hereinafter, various techniques are described in the context of a scenario in which the UE requests a timing coordination that results in a reduction of the timing offset between the respective POs of the first cellular NW and the second cellular NW. However, similar techniques may also be applicable to scenarios in which the UE requests a timing coordination that results in an increase of the timing offset between the respective POs of the first cellular NW and the second cellular NW.

According to various examples, POs of NWs operated by different operators are coordinated for a multi-SIM UE. The reason to coordinate the POs in the time domain is typically to save power. In an idle mode, when monitoring for a paging indication and/or a paging message (paging signal), the UE has to start the wireless interface including the radio modem to receive the paging signal; this corresponds to a transition of the wireless interface from an inactive state to an active state, i.e., a wake-up. The inactive state is also sometimes referred to as low-power state or sleep state. The active state is sometimes referred to as high-power state. To wake-up can require significant time and consumes power, in most cases more than the active time duration to receive the paging signal consumes. Further, the power consumption increases with the number of POs that are monitored by the UE per period of the DRX cycle, i.e., the shorter DRX cycle, the more often the UE has to wake up. The activity of the modem is therefore decreased in case the UE only needs to transition into the active state once every DRX cycle (shortest DRX cycle of the connected NWs), instead of having a number of different and parallel DRX cycles to follow.

To achieve such a reduction of the number of wake-ups per period of the multiple and overlapping DRX cycles, the following techniques can be employed: when the multi-SIM UE (having a first identity and a second identity) registers to a cell belonging to a second NW (e.g., a second pubic land mobile NW, PLMN), the timing of the POs of that cell is based on the corresponding second identity of the UE used at the registration—e.g., a S-Temporary Mobile Subscriber Identity (S-TMSI). In case the POs for the first and second identities of the multi-SIM UE— determined based on a first identity and the second identity—are not overlapping in time domain (since the identities are different and/or the protocol time base such as subframe numbering may be different), the UE determines the timing offset between the first timing of the first POs of the first NW and the second timing of the second POs of the second NW. If there is a significant timing offset—e.g., larger than a predefined threshold—the UE may prefer to adjust the timing of paging by the second NW. Accordingly, the multi-SIM UE can report the timing offset or a preferred timing to the radio access NW (RAN) of the second NW. A respective BS of the RAN may report the timing offset to a core network (CN) entity of the second NW. Alternatively or additionally, the UE may report the timing offset or the preferred timing to the CN of the second NW directly. Transmission of such a report control message may be done during the attach procedure of the second NW.

The timing offset or the preferred timing may be reported using a protocol time base of the second NW, e.g., a sequence number or count of frames or subframes. Alternatively or additionally, the timing offset or the preferred timing may be reported as an "alternative" further identity which can be used to calculate the "alternative" further timing of further POs of the second NW. Alternatively or additionally, the timing offset or the preferred timing may be reported as a time difference in an global time reference (e.g., in milliseconds).

When the NW node of the second NW has received the timing offset or the preferred timing or other respective values, it may signal the adjusted further timing of the further POs that will be used by the second NW to the UE, or simply acknowledge the proposed further timing of further POs already indicated by the UE.

The further POs are coordinated with first POs of the first NW. As a general rule, a further timing offset between the further timing of the further POs and the first timing of the first POs can be smaller than the timing offset between the second timing of the second POs and the first timing of the first POs. For example, the further POs may be fully or partly overlapping in time domain with the first POs. The power consumption in the UE is typically improved as long as the distance between the first and further POs is shorter than the wake-up time in the UE. Generally, the wake-up time can depend on the UE hardware capability and may be as long as tens of milliseconds or even seconds. Booting is typically done in steps, so some parts are booted faster than other parts of the modem and not every part is needed to be booted for monitoring for paging signals.

As will be appreciated, the wake-up time on the order of milliseconds or tens of milliseconds or even up to hundreds of milliseconds can be significant if compared to typical periods of the DRX cycle that are, e.g., in the order of second. For example, the wake-up time can be in the order of 1 to 10% of the period of the DRX cycle. This means that if there are multiple POs to be monitored for multiple identities, the time per period of the DRX cycle that is required to activate the modem can be significant.

Then, the further POs can be monitored by the multi-SIM UE for paging signals from the second NW. The first POs are monitored by the multi-SIM UE for paging signals from the first NW. This enables to receive paging signals from the first and second NWs in overlapping frames or neighboring frames. It may be beneficial for the power consumption that all paging indicators from the first NW and the second NW can be received in the same subframe.

The number of simultaneous paging signals, on different bands etc., the UE can read in the same subframe is sometimes limited by hardware capabilities of the UE.

Therefore, the UE can indicate the preferred further timing so that the number of paging signals that collide in time on different carrier frequencies is less than or equal to the number of paging signals the UE is able to read/receive simultaneously in view of its hardware capability, e.g., whether it has dual transmission capability or not or how many transmit/receive chains are available. This may be achieved by means of signaling a lower timing tolerance.

In case the UE is not capable to receive paging signals on multiple frequencies contemporaneously (e.g., because the UE does not have dual transmission capability or certain frequency combinations are not supported by the two receivers, e.g., due to crosstalk restrictions or shared radio frequency parts), the UE request a preferred timing so that first timing of the first POs and the further timing of the further POs are close to each other in the time domain, but not overlapping. This is still beneficial for the power consumption as long as the distance between the first POs and further POs is smaller than the wake-up time of the UE.

In most cases the multi-SIM UE is not actually paged at a PO, so it can transition the wireless interface into the inactive state until the next ON duration of the DRX cycle. There is a risk that the multi-SIM UE is paged by both NWs in the same period of the DRX cycle: then, the UE may start a data connection setup simultaneously in several NWs in the same frame or subsequent frames. If the UE, due to UE limitations of the hardware capabilities, is not able to respond to the paging signals simultaneously, the UE may choose which paging signal to respond to. In case some of the services are known to be delay tolerant, it may be feasible to respond to the urgent service immediately and wait and delay the response for the delay tolerant service.

FIG. 1 schematically illustrates a cellular NW 100. The example of FIG. 1 illustrates the cellular NW 100 according to the 3GPP 5G architecture. Details of the 3GPP 5G architecture are described in 3GPP TS 23.501, version 15.3.0 (2017-09). While FIG. 1 and further parts of the following description illustrate techniques in the 3GPP 5G framework of a cellular NW, similar techniques may be readily applied to other communication protocols. Examples include 3GPP LTE 4G—e.g., in the MTC or NB-IOT framework—and even non-cellular wireless systems, e.g., an IEEE Wi-Fi technology.

In the scenario of FIG. 1, a UE 101 is connectable to the cellular NW 100. For example, the UE 101 may be one of the following: a cellular phone; a smart phone; an IOT device; a MTC device; a sensor; an actuator; etc.

The UE 101 is a multi-SIM UE 101: the UE 101 is capable of connecting to one or more cellular NWs (in FIG. 1 only a single cellular NW is illustrated)—using two identities 451, 452. The identities 451, 452 can be static or temporary, e.g., a Temporary Mobile Subscriber Identity (TMSI). Each one of the multiple identities 451, 452 can be implemented by a respective SIM such as a USIM.

The UE 101 is connectable to a core NW (CN) 115 of the cellular NW 100 via a RAN 111, typically formed by one or more BSs 112 (only a single BS 112 is illustrated in FIG. 1 for sake of simplicity). A wireless link 114 is established between the RAN 111—specifically between one or more of the BSs 112 of the RAN 111—and the UE 101.

The wireless link 114 implements a time-frequency resource grid. Typically, Orthogonal Frequency Division Multiplexing (OFDM) is used: here, a carrier includes multiple subcarriers. The subcarriers (in frequency domain) and the symbols (in time domain) then define time-frequency resource elements of the time-frequency resource grid. Thereby, a protocol time base is defined, e.g., by the duration of frames and subframes including multiple symbols and the start and stop positions of the frames and subframes. Different time-frequency resource elements can be allocated to different logical channels or reference signals of the wireless link 114. Examples include: Physical Downlink Shared Channel (PDSCH); Physical Downlink Control Channel (PDCCH); Physical Uplink Shared Channel (PUSCH); Physical Uplink Control Channel (PUCCH); channels for random access; etc..

The wireless link 114 of the cellular NWs to which the UE 101 connects using its multiple identities can be different from each other, e.g., use different frequencies, different modulation and/or coding, etc.. There can be a frequency offset between the carrier frequencies of the wireless links 114 of the multiple NWs.

The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data NW 180, e.g., the Internet or a Local Area NW. Application data can be communicated between the UE 101 and one or more servers on the data NW 180.

The cellular NW 100 also includes a mobility-control node, here implemented by an Access and Mobility Management Function (AMF) 131 and a Session Management Function (SMF) 132.

The cellular NW 100 further includes a Policy Control Function (PCF) 133; an Application Function (AF) 134; a NW Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: connection management sometimes also referred to as registration management; NAS termination for communication between the CN 115 and the UE 101; connection management; reachability management; mobility management; connection authentication; and connection authorization. For example, the AMF 131 controls CN-initiated paging of the UE 101, if the respective UE 101 operates in idle mode. The AMF 131 may trigger transmission of paging signals to the UE 101; this may be time-aligned with POs. After UE registration to the NW, the AMF 131 creates a UE context 459 and keeps this UE context, at least as long as the UE 101 is registered to the NW. The UE context 459 can hold one or more identities of the UE 101, e.g., temporary identities used for paging as described herein. The AMF 131 also provides the UE 101 with a temporary identity, the TMSI or S-TMSI, or even a paging-related identity as described in further below. The UE context may also hold a timing offset between POs of multiple NWs to which the UE is attached. The UE context may also hold a timing for paging the UE, e.g., expressed in milliseconds.

A data connection 189 is established by the SMF 132 if the respective UE 101 operates in a connected mode. The data connection 189 is characterized by UE subscription information hosted by the UDM 137. To keep track of the current mode of the UE 101, the AMF 131 sets the UE 101 to CM-CONNECTED or CM-IDLE. During CM-CONNECTED, a non-access stratum (NAS) connection is maintained between the UE 101 and the AMF 131. The NAS connection implements an example of a mobility control connection. The NAS connection may be set up in response to paging of the UE 101.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc. As such, the AMF 131 and the SMF 132 both implement CP mobility management needed to support a moving UE.

The data connection 189 is established between the UE 101 via the RAN 111 and the UP 191 of the CN 115 and towards the DN 180. For example, a connection with the Internet or another packet data NW can be established. To establish the data connection 189, i.e., to connect to the cellular NW 100, it is possible that the respective UE 101 performs a random access (RACH) procedure, e.g., in response to reception of a paging signal. A server of the DN 180 may host a service for which payload data is communicated via the data connection 189. The data connection 189 may include one or more bearers such as a dedicated bearer or a default bearer. The data connection 189 may be defined on the RRC layer, e.g., generally Layer 3 of the OSI model.

Next, details with respect to the paging are described in connection with FIG. 2 and FIG. 3.

Figure 2:
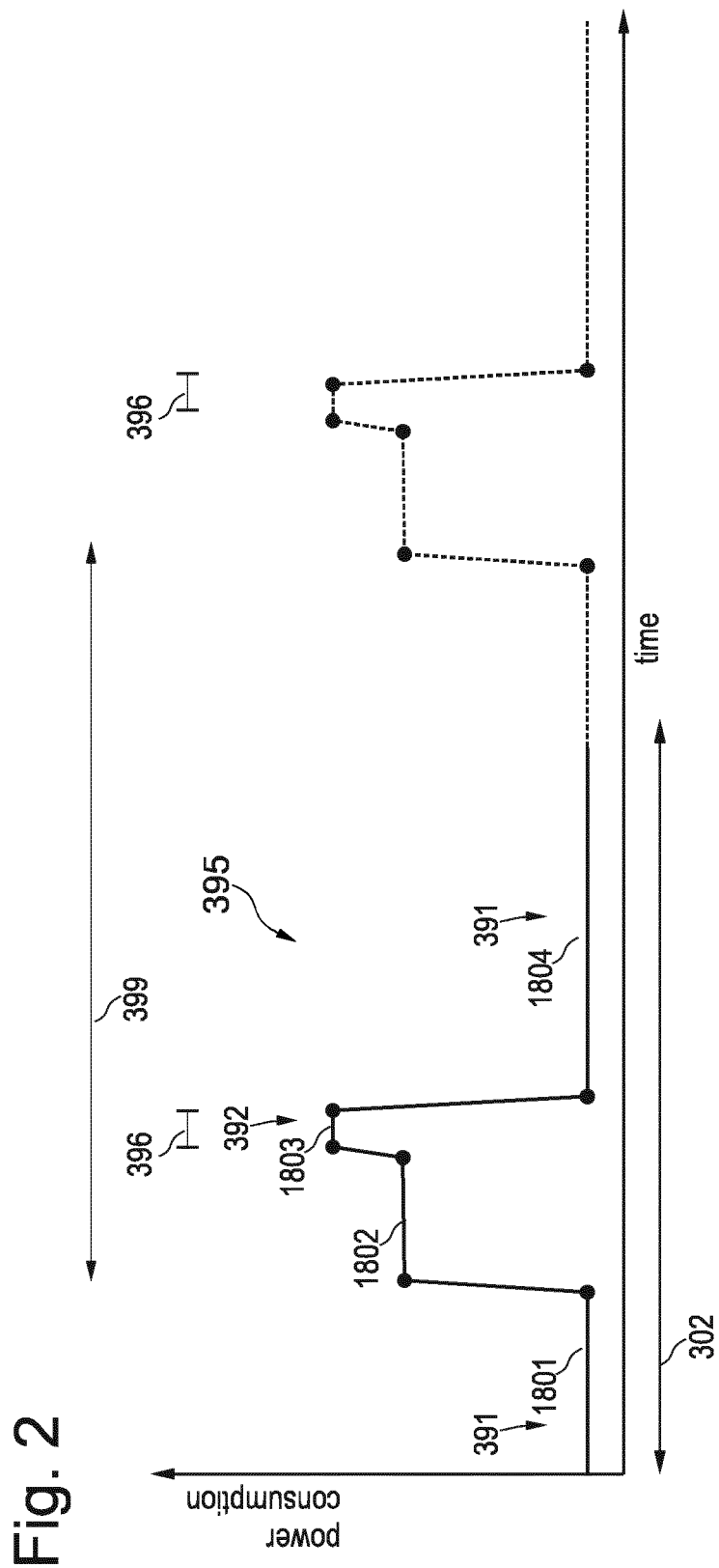
FIG. 2 schematically illustrates a time dependency of power consumption of the multi-SIM UE when transitioning a wireless interface from an inactive state to an active state according to various examples.
Figure 3:
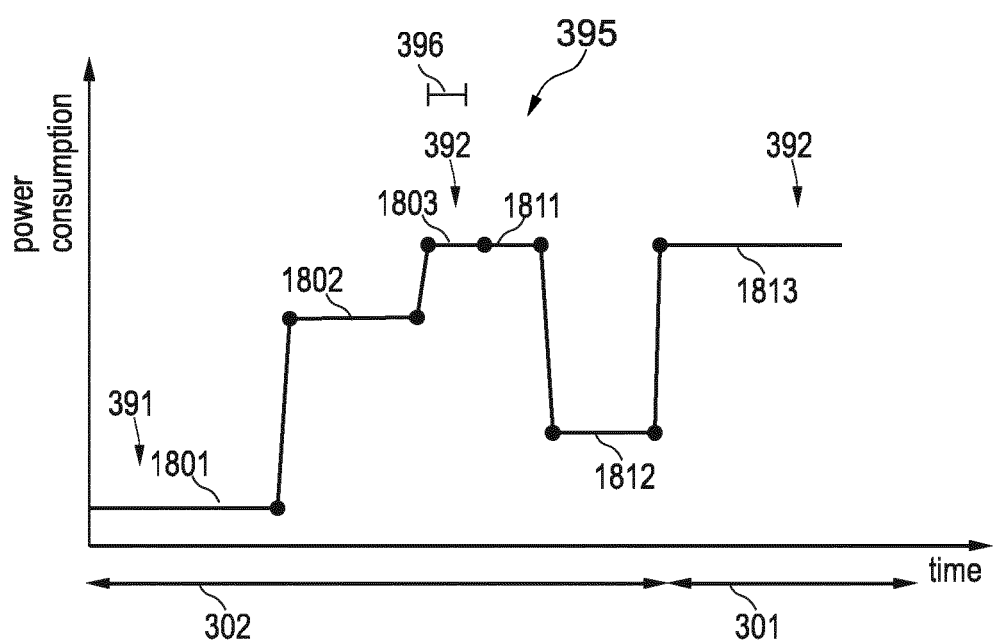
FIG. 3 schematically illustrates a time dependency of power consumption of the multi-SIM UE when transitioning a wireless interface from an inactive state to an active state according to various examples.

FIG. 2 and FIG. 3 schematically illustrate aspects with respect to operation of the UE 101 according to various examples. In particular, FIG. 2 and FIG. 3 schematically illustrate aspects with respect to a power consumption of a wireless interface of the UE 101 as a function of time according to various examples. FIG. 2 and FIG. 3 illustrate the power consumption associated with activity of the UE 101, in particular paging-related activity.

The BS 112 can transmit paging signals. As a general rule, the paging signals are used while the UE 101 is operated in an idle mode 302; the paging signals can trigger a transition from the idle mode 302 to a connected mode 301. The data connection 189 can be established upon receiving a paging signal. Paging signals can also be used in an inactive mode. In the inactive mode, paging can be triggered by the RAN; while in the idle mode 302 the paging is triggered by the CN.

In detail, the idle mode 302 is associated with a DRX cycle 395. Here, the UE 101 periodically transitions a modem of its wireless interface between an inactive state 391 (during time periods 1801 and 1804 in FIG. 2) and an active state 392 (during time period 1803 in FIG. 2 and FIG. 3; note that in FIG. 2 and FIG. 3 only a single period of the DRX cycle 395 is illustrated). The time periods 1801 and 1804 correspond to OFF durations of the DRX cycle 395; and the time period 1803 corresponds to an ON duration of the DRX cycle 395. The time period 1803 of the active state 392 is time-aligned with a PO 396 during which the cellular NW 100 can send the paging signal.

The timing of the PO is given (for the example of 3GPP NR) by (i) the System Frame Number (SFN) and (ii) the subframe within this frame and (iii) the UE_ID, which is derived from the respective identity 451, 452 of the UE 101.

The UE 101 cannot receive paging signals when operating the modem in the inactive state 391; for example, an analog front end and/or a digital front end of the modem may be powered down. For example, amplifiers and analog-to-digital converters may be switched off. For example, decoding digital blocks may be switched off. The UE hardware is entering the inactive state 391 when it is possible to save power. When the UE hardware is in the inactive state 391, one or more clocks may be turned off, all radio blocks and most modem blocks may be turned off, just minimum activity with a low frequency (RTC) clock to start the platform when it is time for the next PO 396 may be maintained. Accordingly, the inactive state is associated with a comparably small power consumption.

When operating the modem in the active state 392, the UE 101 can monitor for paging signals. The various hardware components of the modem of the wireless interface are powered up and operating. For example, the UE 101 can perform blind decoding of the PDCCH to detect a paging indicator. The active state 392 is accordingly associated with a comparably high power consumption.

As illustrated in FIG. 2, the time period 1802 required to transition the UE 101 from the inactive state 391 to the active state 392 (wake-up time) is significant. This transition can require frequency and timing to be (re-)adjusted and the modem to be started to be able to receive paging signals. This takes relatively long time. Accordingly, the power consumption for wake-up is significant. Hereinafter, strategies are described which facilitate reducing the overall power consumption of the UE 101, in particular, by reducing the number of transitions from the inactive state 391 to the active state 392. The duty cycle (i.e., time duration in active state with respect to periodicity of DRX cycle) can be reduced.

The UE is paged, e.g., when the NW 100 intends to set-up the data connection 189 or system-information update or for transmitting a public warning message; reasons can include buffered DL data changes to the cell configuration. The UE 101 typically check one specific subframe in the frame structure once every period of the DRX cycle, typically 1.28 or 2.56 s, reading and blind decoding the PDCCH to check if any paging indicators to any UE in the paging group are sent in the subframe.

In the scenario of FIG. 2, the UE 101 does not receive a paging signal during the time period 1803; and, accordingly, transitions back into the inactive state 391 during the time period 1804. The procedure is repeated after the periodicity 399 of the DRX cycle 395 (as illustrated by the dashed line of FIG. 2. Once a paging indicator is detected, the UE 101 next reads a paging message on the paging channel (PCH)—this is illustrated in FIG. 3, time period 1811. Based on the paging message, a data connection can be set up.

A UE that is paged starts a random-access procedure at a predefined time—e.g., a gap time duration 1812 until the time period 1813 at which the random-access procedure is performed is illustrated in FIG. 3—and then the UE 101 enters the connected mode 301.

The UE 101 has limited information about the service (e.g., incoming call, other downlink application traffic, or even information about system information update or Public Warning message, PWS) until the data connection 189 is established.

The UE monitors for paging indicator and paging messages (paging signals) at the PO 396 of every period of the DRX cycle (for each identity 451, 452). In most of the POs there is no paging message, but the UE 101 has to monitor the wireless link 114 to be prepared if there is a DL message to the UE.

The timing of the PO 396 in 3GPP NR 5G is defined in 3GPP Technical Specification (TS) 38.304 V15.4.0, chapter 7, Paging". In 3GPP LTE 4G these timings are defined in a similar way as defined in 3GPP TS 36.304 V15.4.0, chapter 7, Paging".

The SFN of the frame including the PO (paging frame, PF) is determined by:

$$(SFN + PF\_\text{offset}) \bmod T = (T \text{ div } N) * (UE\_ID \bmod N) \quad \text{(Rule 1)}$$

Where UE_ID given by $$S\text{-TMSI} \bmod 1024, \quad \text{(Rule 2)}$$

Further, in Rule 1, T is the periodicity of the DRX cycle, PF_offset and N are derived from a broadcasted parameter of the respective cell.

Thereby the timing of the PO is defined by the UE identity 451, i.e., via UE_ID and 5-TMSI. UEs with different identities will be typically paged in different PFs and at different POs, unless the UE_ID mod N are identical for the different identities.

Figure 4:
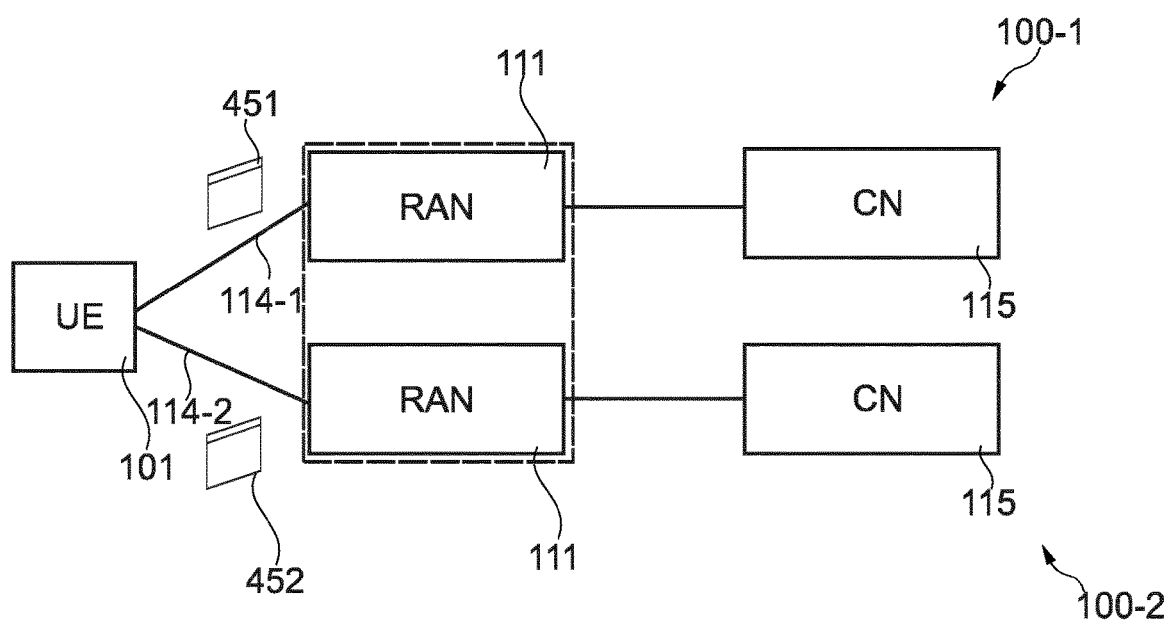
FIG. 4 schematically illustrates a multi-SIM UE being connectable to multiple NWs according to various examples.

FIG. 4 schematically illustrates aspects with respect to the multiple identities 451, 452. In the scenario of FIG. 2, two cellular NWs 100-1, 100-2 are provided. Each of the cellular NWs 100-1, 100-2 can be configured in accordance with the cellular NW 100 of FIG. 1. The UE 101 is configured to communicate with the cellular NW 100-1 on a first wireless link 114-1 using the identity 451; and is configured to communicate with the cellular NW 100-2 on a second wireless link 114-2 using the identity 452. Each cellular NW 100-1, 100-2 can store a respective UE context 459 associated with the respective identity 451, 452.

There are various options available for implementing or not implementing synchronization in time domain between the cellular NWs 100-1, 100-2. They are described in Table 1.

ciated with different paging frames 701 and/or different subframes 702, in accordance with Rules 1 and 2. A timing offset between POs can result.

Figure 6:
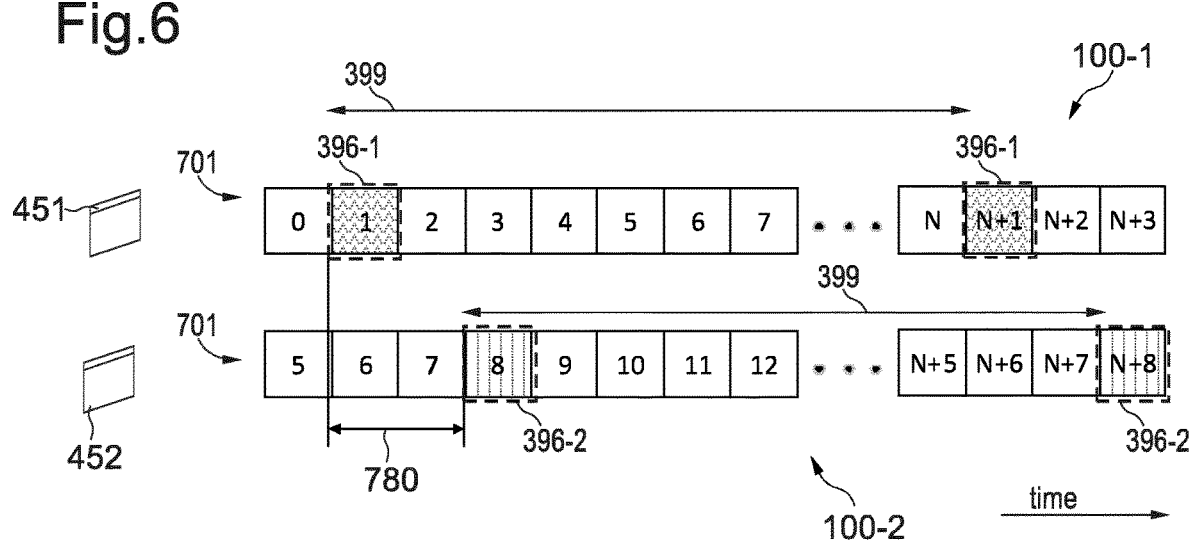
FIG. 6 schematically illustrates a timing offset between POs determined based on multiple identities of the multi-SIM UE according to various examples.

FIG. 6 schematically illustrates aspects with respect to a timing offset 780 between multiple POs 396-1, 396-2 associated with the multiple identities 451, 452. In this case the periodicity 399 of both DRX cycles is N frames, the paging frame 701 of the identity 451 is "1", "N+1", "2N+1", etc.; the paging frame 701 of the identity 452 is "8" and "N+8", etc. . . . . The frame offsets (see synchronization option II in Table 1) between the protocol time base of the NWs 100-1, 100-2 is furthermore 7 frames. Therefore, the corresponding timing offset 780 between the POs 396-1, 396-2 is 2 frames (e.g., corresponding to 20 ms duration).

Figure 7:
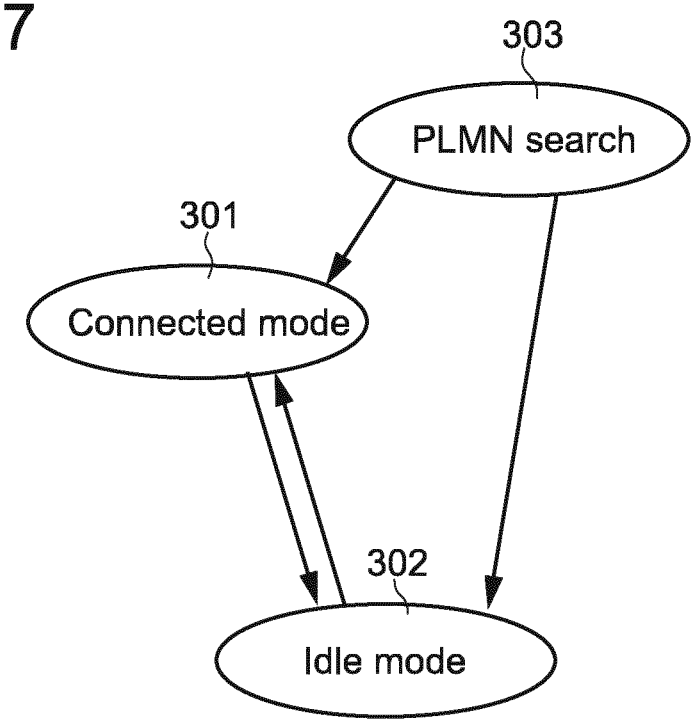
FIG. 7 schematically illustrates multiple modes in which a multi-SIM UE can operate.

FIG. 7 illustrates aspects with respect to different modes 301-303 in which the UE 101 can operate. Example implementations of the operational modes 301-303 are described, e.g., in 3GPP TS 38.300, e.g., version 15.0.0.

Before initially connecting to a NW 100-1, 100-2, a PLMN search mode 303 is executed. Here, multiple candidate frequencies are searched and the UE 101 attempts to acquire synchronization signals to obtain the time reference of the respective cellular NW 100-1, 100-2. At this time, the AMF 131 may not hold a context of the UE 101. Once obtaining the time reference, and identity of the cellular NW 100-1, 100-2 may be checked, e.g., in a broadcast information block. Then, the data connection 189 may be set up, by performing a random access procedure. This triggers a transition into a connected mode 301.

TABLE 1

Synchronization options for multiple cellular NWs

In a first option (synchronization option I), the cellular NWs 100-1, 100-2—more specifically the cells of the RANs 111—are time synchronized (e.g., using a global timing reference, e.g., provided by a satellite mesh such as Global Positioning System). In such a scenario, it would even be possible to use a shared RAN 111 (dashed line in FIG. 2). In the first option, the protocol time base of the transmission on the wireless links 114-1, 114-2 can be synchronized. A common subframe numbering can be used (SFN synchronization). Different USIMs will have different identities 451, 452—e.g., S-TMSI—and since the timings of the POs 396 is based on the S-TMSI (cf. Rule 1 and Rule 2), they will generally differ—i.e., there will be a timing offset between the timings of the POs 396 associated with each identity 451, 452. There can be an exceptional case in which the USIMs have different identities 451, 452, but UE_ID is the same (due to the modulus operation of Rule 2); here, the scenario of FIG. 1—considering the same cell configuration with the number of paging events per frame—leads coincident POs.
In a second option (synchronization option II), the cellular NWs 100-1, 100-2 are time synchronized (e.g., via a satellite timing reference) with frame synchronization; but there is no SFN synchronization (also cf. FIG. 6 below). Here, the timing offset between the POs for the multiple identities 451, 452 is static and the frame and subframe borders are concurrent, but even the same UE_ID will not create simultaneous POs for the two identities 451, 451. There is a fixed offset between the frame numbers.
In a third option (synchronization option III), the cellular NW 100-1, 100-2 are not time synchronized. In such a scenario, the timing offset between the POs 396 associated with the multiple identities 451, 452 can exhibit a time-domain drift. The same UE_ID will generally not create simultaneous paging events in the two cells.

Figure 5:
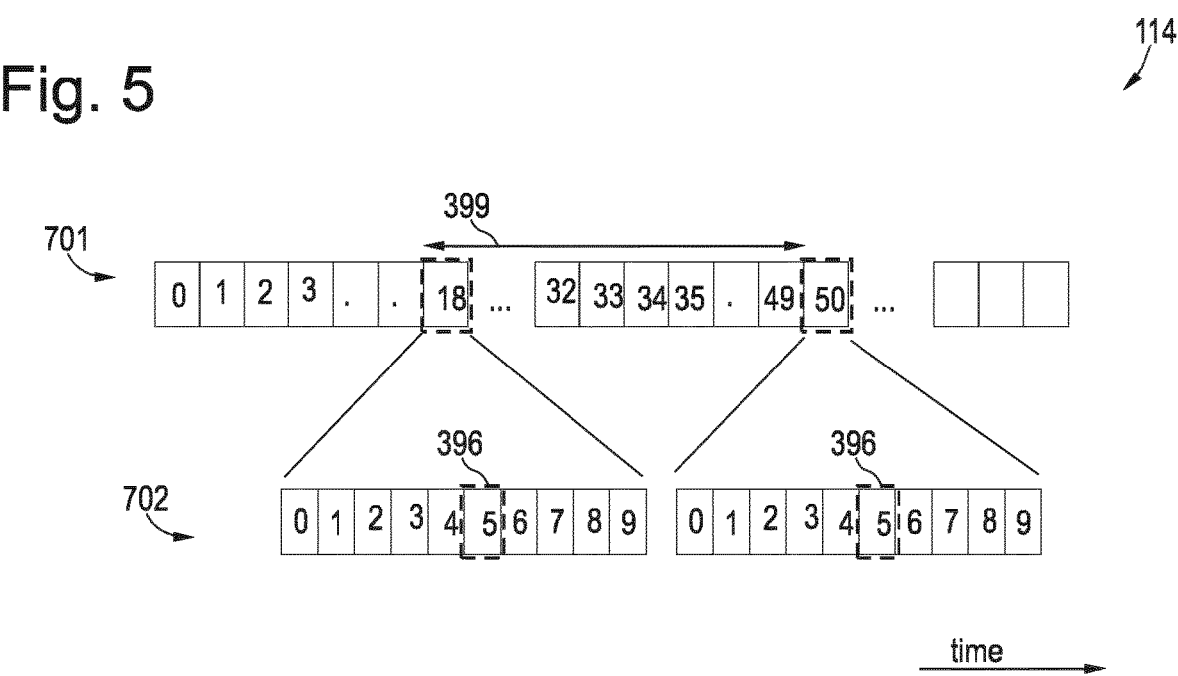
FIG. 5 schematically illustrates POs defined in a protocol time base according to various examples.

FIG. 5 schematically illustrates aspects with respect to a transmission protocol implemented on the wireless link 114. FIG. 5 schematically illustrates transmission frames 701. FIG. 5 also schematically illustrates subframes 702. Each transmission frame 701 includes multiple subframes 702, e.g., ten subframes in the scenario of FIG. 5.

In the example of FIG. 5, the periodicity 399 of the DRX cycle 395 is 32 frames 701 which corresponds to 320 milliseconds. The PO 396 is defined for a certain subframe 702 of a respective paging frame 701 (highlighted by dashed lines in FIG. 5). Different identities 751, 752 can be asso- During the connected mode 301 (cf. FIG. 3; right side), the data connection 189 is set up. For example, a default bearer and optionally one or more dedicated bearers may be set up between the UE 101 and the cellular NW 100. A wireless interface of the UE 101 may persistently operate in an active state, or may implement a DRX cycle.

To achieve a power reduction, it is possible to implement the idle mode 302 (cf. FIG. 2 and FIG. 3). Here, the UE 101 operates in accordance with a DRX cycle 395. The wireless interface of the UE 101 can be transitioned into the inactive state 391. The data connection 189 is released. Paging signals are transmitted to transition the UE 101 back into the connected mode 301.

Figure 8:
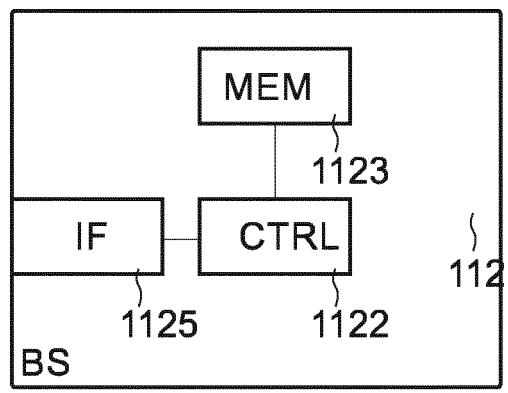
FIG. 8 is a schematic illustration of a base station according to various examples.

FIG. 8 schematically illustrates the BS 112 of the RAN 111.

The BS 112 includes an interface 1125. For example, the interface 1125 may include an analog front end and a digital front end. The BS 112 can communicate with the UE 101 via the interface 1125, on the wireless link 114. The interface 1125 can also be used for signaling towards the CN 115.

The BS 112 further includes control circuitry 1122, e.g., implemented by means of one or more processors and/or software. For example, program code to be executed by the control circuitry 1122 may be stored in a non-volatile memory 1123. In the various examples disclosed herein, various functionality may be implemented by the control circuitry 1122 by executing the program code, e.g.: obtaining a request for coordinated paging from a multi-SIM UE 101, e.g., via the interface 1125; coordinating paging with a further NW; implementing paging, e.g., by transmitting, to the multi-SIM UE 101, paging indicators and/or paging messages (paging signals). As a general rule, paging messages can resolve ambiguities with respect to multiple UEs being addressed by the same paging indicator.

Figure 9:
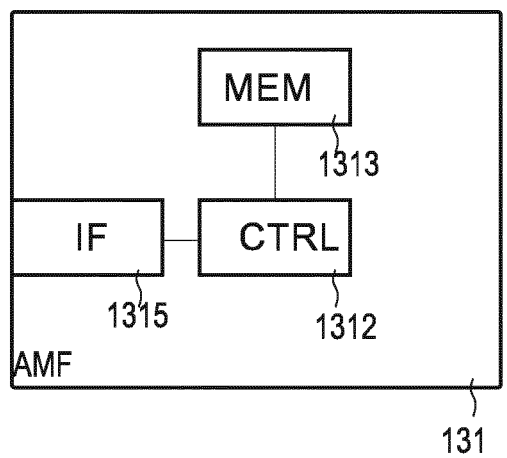
FIG. 9 is a schematic illustration of a mobility-control node of the cellular NW according to various examples.

FIG. 9 schematically illustrates the AMF 131.

The AMF 131 includes an interface 1315. For example, the interface 1315 can be for signaling to other core NW nodes or towards the radio access NW (e.g., via the N2 reference point of FIG. 1) or to the UE 101 (e.g., via the N1 reference point of FIG. 1).

The AMF 131 further includes control circuitry 1312, e.g., implemented by means of one or more processors and/or software. For example, program code to be executed by the control circuitry 1312 may be stored in a non-volatile memory 1313. In the various examples disclosed herein, various functionality may be implemented by the control circuitry 1312 by executing the program code, e.g.: obtaining a request for coordinated paging from a multi-SIM UE; coordinating paging with a further NW; implementing paging, e.g., by transmitting, to the base station, a command to transmit paging signals to the multi-SIM UE.

Figure 10:
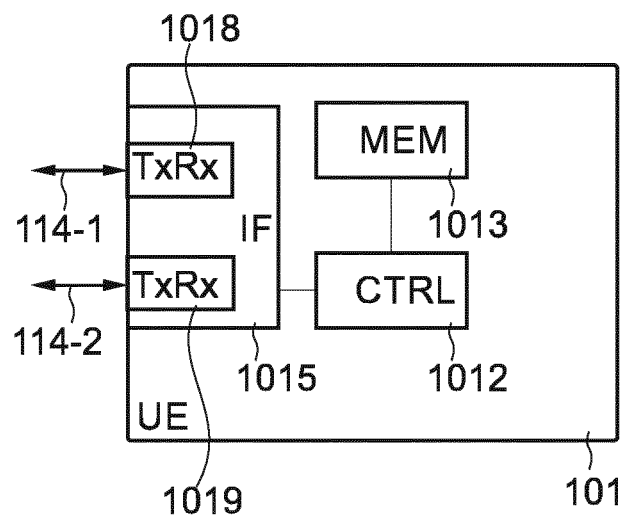
FIG. 10 is a schematic illustration of a multi-SIM UE according to various examples.

FIG. 10 schematically illustrates the multi-SIM UE 101. For example, the UE 101 may be configured to connect to a cellular NW 100, 100-1, 100-2 and to communicate using the respective identity 451, 452.

In the example of FIG. 7, the UE 101 is a dual-radio UE and includes a wireless interface 1015 having two radio modems 1018, 1019. Accordingly, the UE 101 has dual transmission capability and could, e.g., monitor for paging signals on multiple frequencies contemporaneously at overlapping or partly overlapping POs. Each radio modem 1018, 1019 may be configured to use a respective identity 451, 452.

For example, each radio 1018, 1019 of the interface 1015 may include an analog front end and a digital front end. The UE 101 can transmit or receive on the radio 1018 and, at the same time, transmit or receive on the radio 1019 (dual transmission capability).

A radio 1018, 1019 can typically have two clock sources. One low frequency clock with low power consumption and worse accuracy/stability. One faster one with higher accuracy and better stability. The latter one needed for decoding the signals without distorting the signal too much and locked to carrier frequency by a high frequency PLL. Then the digits of modem typically have several clocks for clocking CPU and hardware accelerators memories etc. Those are product from phased-locked loops utilizing typically a slower clock source that might be this real-time clock.

While in the example of FIG. 10, the UE 101 is illustrated to have two radio modems 1018, 1019, in other examples the UE 101 could have only a single radio modem. Then, the multi-SIM UE 101 does not have dual transmission capability. It can employ time duplexing to communicate with multiple NWs 100-1, 100-2 using multiple identities 451, 452.

The UE 101 also includes control circuitry 1012, e.g., implemented by means of one or more processors and software. For example, program code to be executed by the control circuitry 1012 may be stored in a non-volatile memory 1013. In the various examples disclosed herein, various functionality may be implemented by the control circuitry 1012 by executing the program code, e.g.: communicating with a first NW on one or more first frequencies; communicating with a second NW on one or more second frequencies; determining a timing offset between timings of POs associated with multiple identities of a multi-SIM UE; requesting coordination of paging associated with the multiple identities at least one NW; monitoring for paging signals, e.g., in accordance with coordinated paging; etc.

Figure 11:
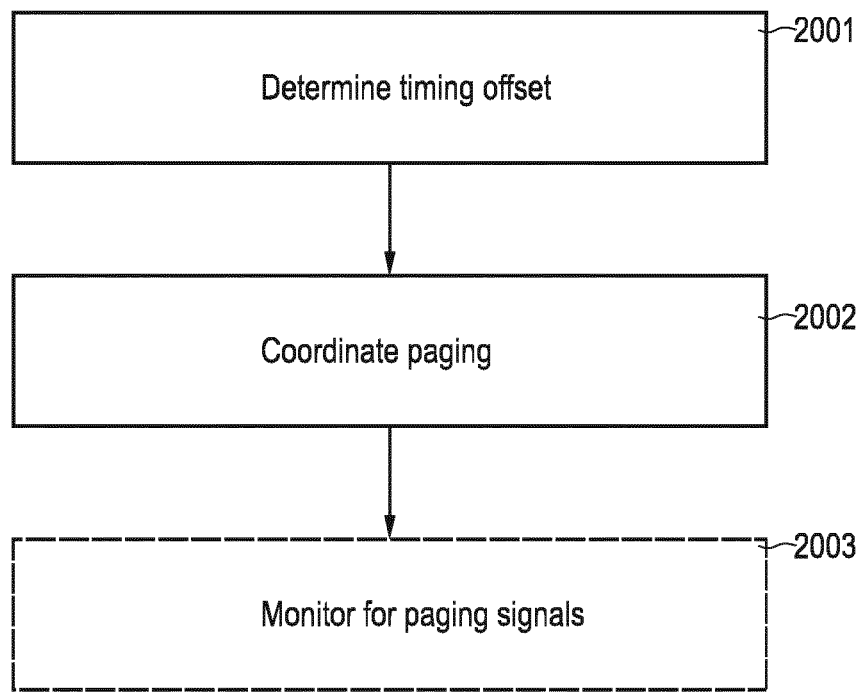
FIG. 11 is a flowchart of a method according to various examples.

FIG. 11 is a flowchart of a method according to various examples. For example, the method of FIG. 11 may be executed by a UE, e.g., the multi-SIM UE 101 as illustrated in FIG. 10.

At box 2001, a timing offset is determined. The timing offset is between a first timing of first POs of a first cellular NW associated with a first identity of the multi-SIM UE, and a second timing of second POs of a second cellular NW associated with a second identity of the multi-SIM UE. An example timing offset 780 is illustrated in FIG. 6 for the first PO 396-1 of the first cellular NW 100-1 and the second PO 396-2 of the second cellular NW 100-2.

Next, at box 2002, the timing of the first and second POs is coordinated.

This can include the multi-SIM UE requesting a coordination of paging from the first cellular NW and the second cellular NW. The coordination is requested based on the timing offset that is determined at box 2001.

The coordination can be requested to increase the timing offset or to decrease the timing offset, depending on the particular scenario.

The multi-SIM UE can transmit at least one request control message that is indicative of this request. The at least one request control message could be transmitted to the first cellular NW and/or the second cellular NW.

For example, the at least one request control message could be indicative of whether the timing offset is to be increased or is to be decreased.

More specifically, the at least one request control message could be transmitted to a BS of a RAN of the first cellular NW or the second cellular NW, or to a mobility-control node of the CN of the first cellular NW or of the second cellular NW (such as the AMF 131, cf. FIG. 1), or to another node of the CN.

Box 2002 may optionally include receiving a response from the first cellular NW and/or the second cellular NW. For example, at least one response control message may be received from the first cellular NW and/or the second cellular NW to which the at least one request control message has been transmitted. Here, the at least one response control message is associated with the at least one request control message previously transmitted.

The at least one response control message may grant or deny a further timing of further POs of the second NW. The further timing of the further POs may be different from the second timing of the second POs. For example, the further timing may be such that a further timing offset between the first timing of a first POs and the further timing of the further POs is reduced—e.g., to zero or to a finite value—if compared to the timing offset between the first timing of the first POs and the second timing of the second POs. Alternatively or additionally, it would also be possible that the further timing is such that the further timing offset between the first timing and the further timing is increased. This may, e.g., depend on the respective preference as indicated by the UE.

Then, at optional box 2003, the multi-SIM UE 101 can monitor for paging signals. In detail, it would be possible that the multi-SIM UE 101 monitors for first paging signals from the first NWs in accordance with the first timing of the first POs and, furthermore, monitors for second paging signals from the second NW in accordance with a further timing of the further POs. If a single-radio multi-SIM UE 101 is employed, it is possible to switch frequencies between adjacent ones of the first POs and the further POs of a given period of the DRX cycle.

Due to the reduced further timing offset between the first timing and the further timing, the multi-SIM UE may perform a single wake-up per period of the DRX cycle and, in response to the single wake-up, combine monitoring for the first paging signals and monitoring for the second paging signals before transitioning back into the inactive state (if no paging signals are received). This helps to reduce the power consumption.

This finding is further illustrated in connection with FIG. 12.

Figure 12:
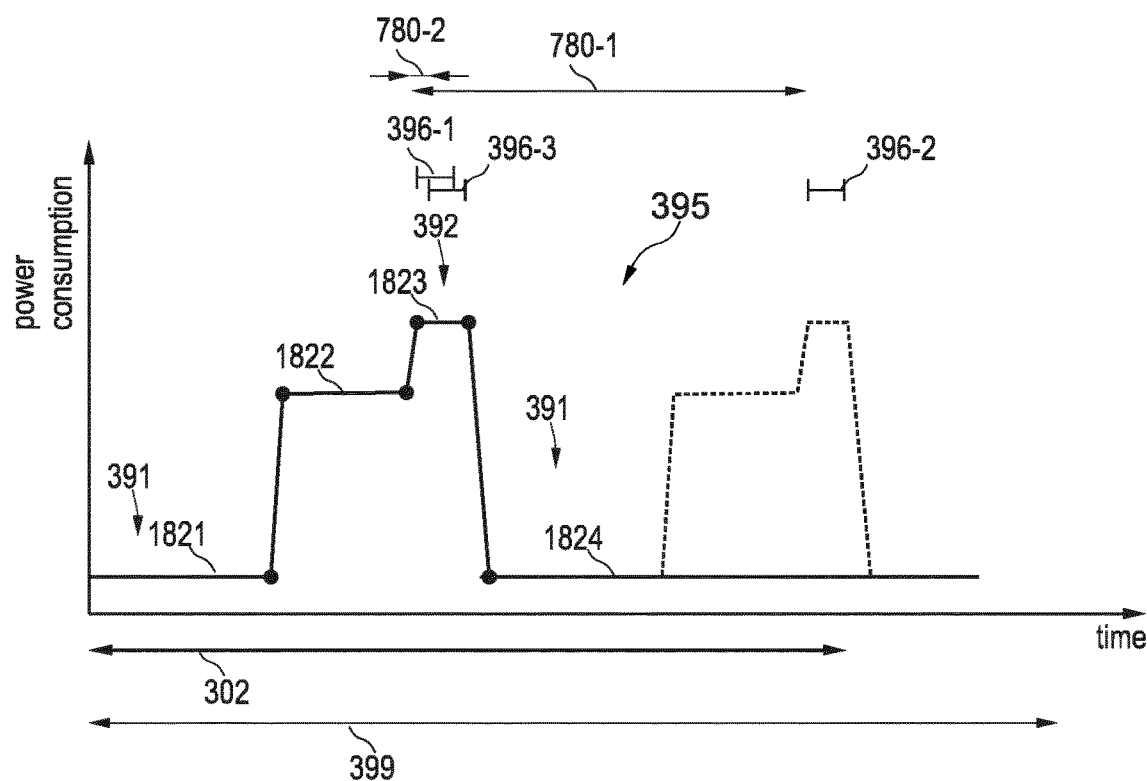
FIG. 12 schematically illustrates a time dependency of power consumption of the multi-SIM UE when transitioning a wireless interface from an inactive state to an active state according to various examples.

FIG. 12 schematically illustrates aspects with respect to the timing of POs 396-1, 396-2, and 396-3. FIG. 12 plots the power consumption at the wireless interface 1015 of the multi-SIM UE 101 as a function of time.

As illustrated, there are first POs 396-1 associated with the first identity 451 used by the UE 101 to communicate with the first cellular NW 100-1. In a manner comparable to what has already been explained in connection with FIG. 2, the multi-SIM UE 101 initially operates in the inactive state 391 during the time period 1821. Then, during the time period 1822 the multi-SIM UE 101 transitions the wireless interface from the inactive state 391 to the active state 392. At the time period 1823, the multi-SIM UE 101 monitors for first paging signals from the first cellular NW 100-1—as well as for second paging signals from the second cellular NW 100-2. This is because the further timing of the further POs 396-3 of the second cellular NW 100-2 is coordinated with the first timing of the first POs 396-1 of the first cellular NW 100-1.

The first timing of the first PO 396-1 is determined based on the identity 451 (Rule 1, Rule 2). The further timing of the further PO 396-3, however, is obtained differently, i.e., not based on Rule 1 or Rule 2. This is explained next.

Considering the identity 452 of the multi-SIM UE 101 yields the PO 396-2, according to Rule 1 and Rule 2. As illustrated in FIG. 12, there is a significant timing offset 780-1 between the timing of the first POs 396-1 and the timing of the second POs 396-2. This would force the UE 101 to transition back to the inactive state 391 and then transition back into the active state 392 within a single period 399 of the DRX cycle 395, as illustrated by the dotted line in FIG. 12. This is associated with an increased power consumption.

On the other hand, the further timing offset 780-2 between the first timing of the first POs 396-1 and the further timing of the further POs 396-3 is smaller than the timing offset 780-1. In fact, as illustrated in FIG. 12, the first POs 396-1 and the further POs 396-3 are partly overlapping in time. As a general rule, they could be fully overlapping, partly overlapping, adjacent to each other or arranged with a time gap in between. As a further general rule, the first POs 396-1 and the further POs 396-3 could be arranged in the same or adjacent subframe 702, in case the cellular NWs 100-1, 100-2 are synchronized (synchronization option I or II as described above in Table 1).

As a general rule, the further timing could be associated with a respective further identity or paging identity of the UE, e.g., a paging temporary identity (P-TMSI). This would be given by:

$$(SFN+PF\_\text{offset}) \bmod T = (T \text{ div } N) * (UE\_ID' \bmod N) \quad \text{(Rule 3)}$$

Where UE_ID' given by $$P\text{-TMSI} \bmod 1024, \quad \text{(Rule 4)}$$

The paging identity can have the same structure as the second identity 452, e.g., same length, same number space, etc.. However, the paging identity can yield the further timing of the further POs 396-3 which is different from the second timing of the second POs 396-2.

The coordination of the first timing of the first PO 396-1 with the further timing of the further PO 396-3 facilitates a single transition from the inactive state 391 to the active state 392, per period 399 of the DRX cycle 395. This reduces the power consumption if compared to the reference implementation illustrated by the dashed line.

A scenario is illustrated in FIG. 12 can be, in particular, helpful for multi-SIM UEs that can contemporaneously monitor for paging signals from multiple cellular NWs on multiple frequencies. Another scenario is illustrated in FIG. 13 can be helpful for single-radio multi-SIM UEs that cannot contemporaneously monitor for paging signals from multiple NWs on multiple frequencies, but which have to implement a time-multiplex scenario using frequency switching between the first PO 396-1 and the further PO 396-3.

Figure 13:
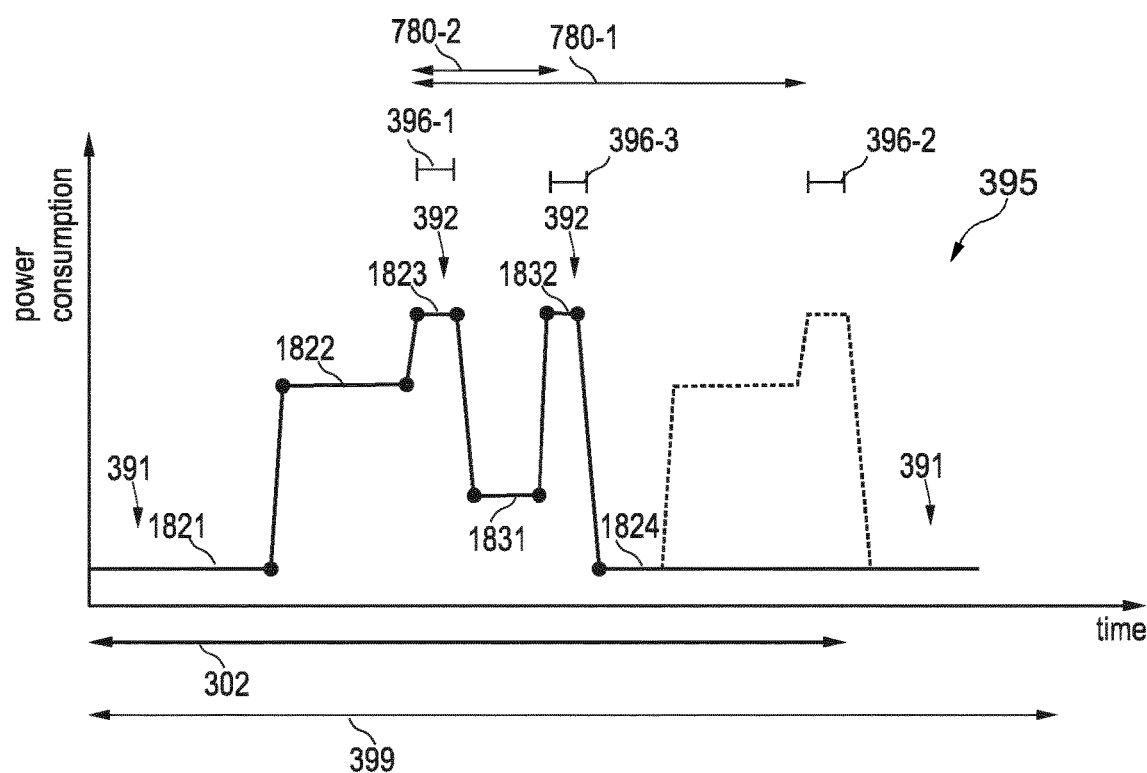
FIG. 13 schematically illustrates a time dependency of power consumption of the multi-SIM UE when transitioning a wireless interface from an inactive state to an active state according to various examples.

FIG. 13 schematically illustrates aspects with respect to the timing of POs 396-1, 396-2, and 396-3. FIG. 13 plots the power consumption at the wireless interface 1015 of the multi-SIM UE 101 as a function of time.

The scenario FIG. 13 generally corresponds to the scenario FIG. 12. In the scenario FIG. 13, there is a larger timing offset 780-2 between the first POs 396-1 and the further POs 396-3, if compared to the scenario of FIG. 12. This is to accommodate for switching of frequency (e.g., adjust an RF oscillator circuitry) between the carrier frequencies of the two cellular NWs 100-1 and 100-2, during the time period 1831, before monitoring for the paging signals from the NW 100-2 during the time period 1832.

Accordingly, as will be appreciated from a comparison FIG. 12 in FIG. 13, it is possible that the timing offset 780-2 is coordinated with respect to the hardware capability of the modem of the wireless interface 1015 of the UE 101. The hardware capability can pertain to, e.g.: single-radio or multi-radio UE; frequency switching rate; idle times; energy consumption when operating in the inactive state 391; energy consumption when operating in the active state 392; energy consumption for a wake-up transition from the inactive state 391 to the active state 392; etc..

Figure 14:
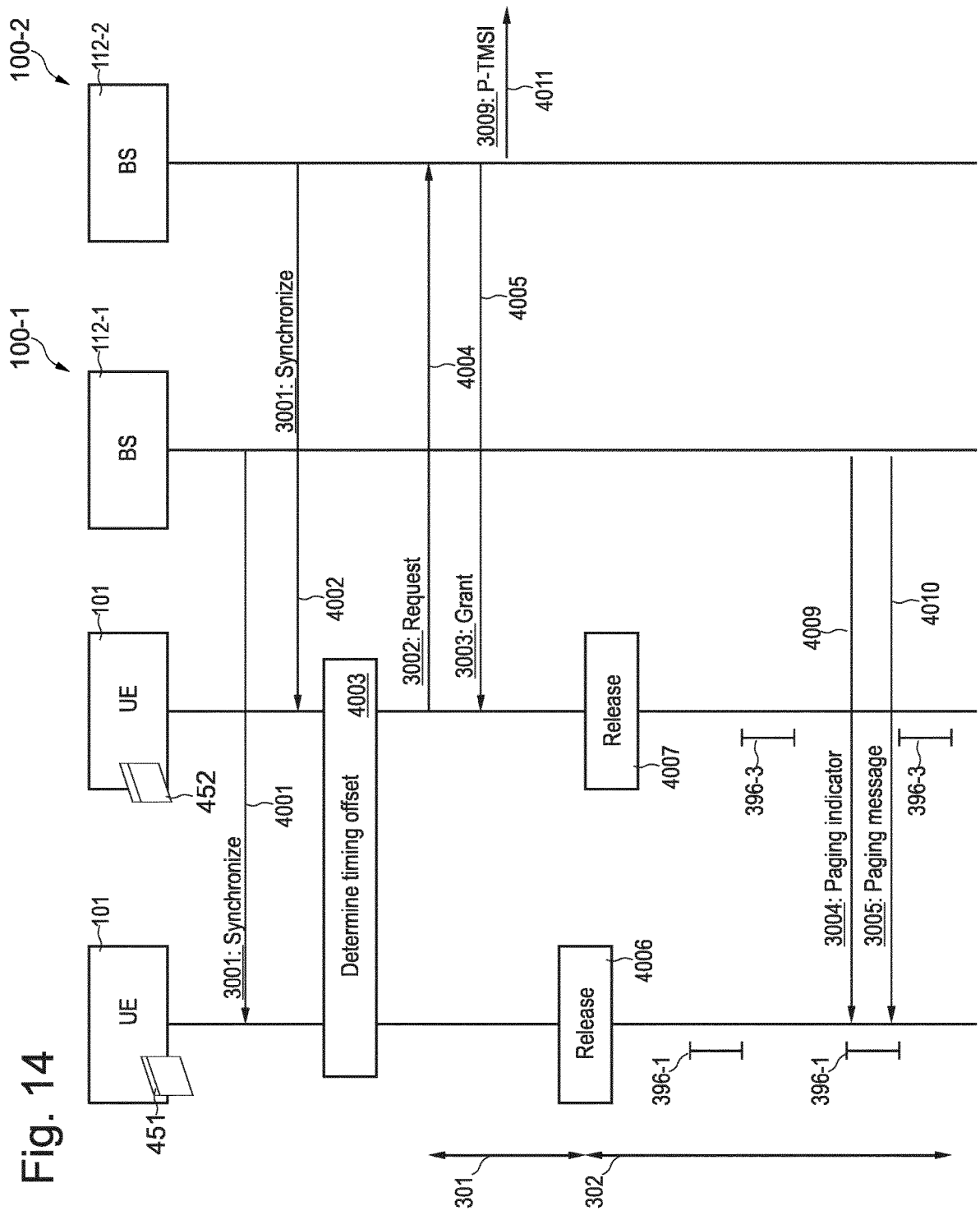
FIG. 14 is a signalling diagram of communication between the multi-SIM UE and base stations of multiple NWs according to various examples.

FIG. 14 is a signaling diagram of communication between the multi-SIM UE 101 using the multiple identities 451 and 452, and a BS 112-1 of the cellular NW 100-1 and a further BS 112-2 of the NW 100-2.

While FIG. 14 illustrates signaling between the multi-SIM UE 101 and the BSs 112-1, 112-2, similar techniques may be implemented for a scenario in which the multi-SIM UE 101 signals with AMFs of the multiple cellular NWs 100-1, 100-2.

At 4001, the UE 101 acquires a timing of the BS 112-1 of the first cellular NW 100-1; for example, the UE 101 could receive a synchronization signal 3001.

Similarly, at 4002, the UE 101 acquire is a timing of the BS 112-2 of the second cellular NW 100-2.

At 4003, the UE 101 determines the timing offset 780-1 between the first timing of the first POs 396-1 of the first cellular NW 100-1 given by the identity 451 and the second timing of the second POs 396-2 of the NW 100-2 given by the identity 452.

As a general rule, various scenarios are conceivable for triggering execution of 4003, i.e., triggering the determination of the timing offset 780-1. One option would be that the timing of the second cellular NW 100-2 is acquired at a point in time when the timing of the NW 100-1 as already been acquired (i.e., connecting to a further NW, in addition to an already existing connection). In particular in such a scenario it would be possible that a request control message is transmitted during an attach procedure to the second cellular NW 100-2. Alternatively or additionally, it would be possible that the timing offset 780-1 is determined in response to a cell re-selection, e.g., when the UE 101 re-selects a cell of the second cellular NW 100-2. This can, in particular, be dependent on whether or not there is a synchronization between the multiple cells of the NW 100-2. In yet a further option, it would be possible that the timing offset 780-1 is determined upon an accumulated timing drift between the first and second cellular NWs 100-1, 100-2 exceeding a threshold and/or in accordance with a predefined schedule. There may be a timing drift between the first and second cellular NWs 100-1, 100-2, in case they are not synchronized. The timing drift can accumulate over the course of time, i.e., grow larger and larger. A timing drift can be in the order of 0.2 us to 1 us per second. Thus, the accumulated timing drift after 10.000 seconds would be 10 ms, which is the duration of a frame 701 according to 3GPP 5G. The accumulated timing drift can be tracked. Once the accumulated timing drift exceeds a certain predefined threshold, then, a re-coordination of the paging may be triggered by re-determining the current timing offset 780-1. A predefined schedule, on the other hand, may be a convenient tool to simplify the re-execution of the determination of the current timing offset 780-1 from time to time. In yet a further option, the timing offset 780-1 is determined in response to a respective trigger message form the first or second cellular NW 100-1, 100-2. For example, the respective trigger message could be transmitted as part of a handover or cell re-selection procedure, due to UE mobility.

Based on the timing offset 780-1, the UE 101 then transmits a request control message 3002 to the BS 112-2, at 4004. For example, it would be possible that the request control message 3002 is transmitted as part of an attach procedure to connect to the NW 100-2, i.e., to set up a respective data connection 189 in the connected mode 301. It would also be possible to transmit the request control message 3002 while operating in the connected mode 301, e.g., as Radio Resource Control signaling on the PUSCH utilizing a pre-existing data connection 189. The control message 3002 could also be transmitted in a cell reselection/handover procedure.

Transmitting the request control message 3002 based on the timing offset 780-1 can mean that the request control message 3002 is selectively transmitted, e.g., if the timing offset 780-1 exceeds or falls below a certain predefined threshold, or is non-zero, or fulfills one or more predefined criteria (e.g., is outside of certain predefined tolerances). The predefined threshold could be associated with the hardware capability of the UE 101. Alternatively or additionally, transmitting the request control message 3002 based on the timing offset 780-1 can mean that the request control message 3002 includes an information element that is determined based on the timing offset 780-1 or that is indicative of the timing offset 780-1.

As a general rule, various options are available for implementing the request control message 3002.

In a first option, it would be possible that the request control message 3002 is indicative of the timing offset 780-1. For example, the timing offset 780-1 could be expressed in a protocol time base, e.g., as a count of frames 701 or subframes 702 of the NW 100-2 and/or the NW 100-1. This may be, in particular, applicable in the case where the protocol time bases of the NWs 100-1, 100-2 are synchronized (synchronization options I and II of Table 1).

In a second option, it would be possible that the request control message 3002 is indicative of a lower timing tolerance or an upper timing tolerance associated with the desired further timing offset 780-2. The request control message 3002 can be indicative of a range of values for the desired further timing offset 780-2. Accordingly, it would be possible that the UE 101 indicates whether there is a lower threshold for the desired further timing offset 780-2 of the coordinated first and further POs 396-1, 396-3. For instance, such a lower timing tolerance could be associated with a respective hardware capability of a single-radio wireless interface 1015 of the UE 101, e.g., given by a tuning rate of an adjustable frequency filter or oscillator (such a scenario is described in FIG. 13 where during the timer period 1831 the frequency switching is implemented). For instance, it would be possible that the lower timing tolerance is determined by the UE 101 depending on a frequency distance between a carrier frequency of the first cellular NW 100-1 and a carrier frequency of the second cellular NW 100-2. Alternatively or additionally, would be possible that the UE 101 indicates whether there is an upper threshold for the desired further timing offset 780-2 of the coordinated first and third POs 396-1, 396-3. For instance, such an upper timing tolerance could be associated with a respective hardware capability of the wireless interface 1015 of the UE 101, e.g., given by an overall power consumption of the wake-up transition from the inactive state 391 to the active state 392, possibly in relation to the power consumption per time of operating in the active state 392. In other words, there can be a break-even point at which contiguous operation in the active state 392 becomes favorable in terms of power consumption if compared to two wake-up transitions from of the inactive state 391 to the active state 392. Thus, as will be appreciated from the above, the lower timing tolerance and/or the upper timing tolerance can be associated with a hardware capability of a modem of the wireless interface of the UE.

In a third option, would be possible that the request control message 3002 is indicative of a hardware capability of a modem of the UE 101 to receive multiple paging signals contemporaneously and/or on multiple frequencies. In other words, would be possible that the request control message 3002 is indicative of whether the UE 101 is a single-radio or multi-radio device, more specifically of whether the UE 101 has two or more receive chains.

In fourth option, it would be possible that the UE 101 determines a paging identity based on the timing offset 780-1. The paging identity may be a temporary identity for the purpose of coordinated paging. See Rules 3 and 4. The paging identity may have the same structure—e.g., length, sequence number space, etc. —as the identity 452. However, the paging identity can be associated with a further timing of the further POs 396-3, instead of with the second timing of the second PO 396-2 (cf. FIG. 12 and FIG. 13). It would then be possible that the request control message 3002 is indicative of the paging identity. Thereby, it is possible to implicitly inform the BS 112-2 of the desired further timing of the further PO 396-3.

In a fifth option, it would be possible that the request control message 3002 is indicative of the desired further timing of the further PO 396-3 in a global timing reference or a protocol time base of the protocol employed by the cellular NW 100-2, e.g., by indicating a sequence number of a desired paging frame 701 and/or a sequence number of a desired subframe 702 within the paging frame 701 (cf. FIG. 5).

In a sixth option, it would be possible that the request control message 3002 is indicative of whether the UE 101 requests an increase of the timing offset 780-1 or requests a decrease of the timing offset 780-2. In other words, it would be possible that the UE 101 signals whether the coordination should be such that the first POs 396-1 and the further POs 396-3 are closer together in time domain if compared to the first POs 396-1 and the second POs 396-2.

Next, at 4005, a response control message 3003 is received from the NW 100-2, here specifically from the BS 112-2. The response control message 3003 is associated with the request control message 3002. I.e., it would be possible that the response control message 3003 is transmitted by the BS 112-2 in response to receiving the request control message 3002. For example, the response control message 3003 could include a pointer towards the request control message 3002.

The response control message 3003 grants the further timing of the further POs 396-3 of the NW 100-2.

If required, the data connections 189 towards the first cellular NW 100-1, as well as towards the second cellular NW 100-2 are optionally released at 4006 and 4007 (the UE 101 now operates in the idle mode 302 towards the first and second NWs 100-1, 100-2). Accordingly, the UE 101 monitors for paging signals 3004, 3005 from the first cellular NW 100-1 on the first POs 396-1; and monitors for paging signals from the second cellular NW 100-2 on the further PO 396-3.

As explained above, it is possible that the first timing of the first POs 396-1 and the further timing of the further POs 396-3 is coordinated with respect to the lower timing tolerance and/or the upper timing tolerance of the modem of the wireless interface 1015 of the UE 101. The further timing of the further POs 396-3 can be determined to be within a timing tolerance range. For example, in the illustrated scenario of FIG. 14, the first POs 396-1 and the further POs 396-3 are non-overlapping, but adjacent.

At 4009 and 4010, paging signals, in particular paging indicator 3004 and a paging message 3005 are received from the BS 112-1.

As a general rule, the information content of the response control message 3003 may vary along with the information content of the request control message 3002. For instance, where the request control message 3002 already is indicative of the requested further timing of the further PO 396-3, the response control message 3003 could simply positively or negatively acknowledge this further timing. Differently, where the request control message 3002 does not indicate a specific requested further timing of the further PO 396-3, the response control message 3003 could be indicative of the further timing of the further PO 396-3. For example, as already explained in connection with the request control message 3002, the response control message 3003 could be indicative of the further timing in a protocol time base of the cellular NW 100-2, or in a global timing reference, or using a paging indicator. Thus, as will be appreciated, the distribution of logic for determining the further timing can be distributed between the UE 101 and the cellular NW 100-2. This is also illustrated in Table 2 below:

TABLE 2

Example implementations of messages 3002 and 3003

| Example | Information content of request control message 3002 | Information content of response control message 3003 |
| --- | --- | --- |
| A | Current timing offset 780-1, e.g., expressed as frame/subframe count or in absolute time reference | Further timing of further POs 396-3, e.g., expressed as paging identity of frame/subframe number |
| B | Preferred further timing of further PCs 396-3, e.g., expressed as paging identity of frame/subframe number | Positive acknowledgement or negative acknowledgement |
| C | Lower timing tolerance and/or upper timing tolerance for further timing of further POs 396-3, e.g., expressed as paging identity of frame/subframe number | Further timing of further POs 396-3, e.g., expressed as paging identity of frame/subframe number |
| D | Combination of Example A) and Example C) | Further timing of further POs 396-3, e.g., expressed as paging identity of frame/subframe number |
| E | Example A), and hardware capability of UE (e.g., multi-radio or single-radio multi-SIM UE) | Further timing of further POs 396-3, e.g., expressed as paging identity of frame/subframe number |
| D | Indication of preference: reduction vs. increase of timing offset 780-1 | Further timing of further POs 396-3, e.g., expressed as paging identity of frame/subframe number |

In the scenario of FIG. 14, the BS 112-2 of the second cellular NW 100-2 can optionally inform, at 4011, other BSs of the second cellular NW 100-2 (e.g., within a tracking area) and/or the AMF 131 of the second cellular NW 100-2 about the paging identity. This can be done by transmitting a respective control message 3009. This helps to be able to page the UE 101 even when the UE 101 moves from cell to cell of the second cellular NW 100-2.

Figure 15:
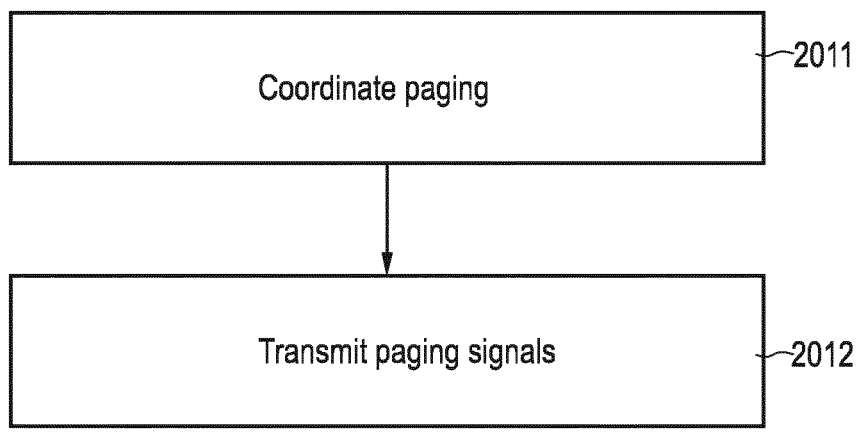
FIG. 15 is a flowchart of a method according to various examples.

FIG. 15 is a flowchart of a method according to various examples. The method of FIG. 15 may be executed by a BS. For example, the method of FIG. 15 may be executed by the BS 112-2 of the second cellular NW 100-2. Alternatively or additionally, it would be possible that the method of FIG. 15 is executed by a mobility-control node of a core of a NW. For example, it would be possible that the method of FIG. 15 is executed by the AMF 131, e.g., of the second cellular NW 100-2.

At box 2011, paging is coordinated between multiple NWs. For example, a request for coordination of paging between multiple NWs is obtained from a UE. For example, a corresponding request control message may be received (cf. FIG. 14: request control message 3002).

Then, the BS can decide on whether to grant or deny the request for coordination.

Depending on the outcome of this decision-making process, a positive or a negative acknowledgement may be transmitted to the UE. For example, a response control message associated with the request control message may be transmitted to the UE (cf. FIG. 14: response control message 3003).

For scenarios in which the BS has the freedom to select a particular further timing of the further POs (e.g., scenarios A, C, D, and E of Table 2), there are various decision criteria that can be considered, at the BS, in the selection of the particular further timing. For instance, it would be possible to consider a load balancing between multiple candidate POs. For example, it would be possible to consider UE mobility.

Sometimes, there may be a need to re-adjust the further timing, e.g., due to UE mobility. For example, a situation can occur in which the UE moves from a first cell to a second cell of the second NW. It would be possible that the protocol time base employed by a BS of the first cell is offset with respect to the protocol time base employed by another BS of the second cell, i.e., there may be a timing advance between the first cell and the second cell. Then, it would be possible to adjust the further timing in response to UE mobility. The second BS can be informed accordingly if the method is executed by a mobility-control node of the second NW or by the first BS.

Next, at box 2012, paging signals are transmitted in accordance with the coordinated timing. For example, if the coordinated timing corresponds to implementing a further timing of further POs based on a paging identity of the UE, different from the actual identity of the UE, then the paging signals can be transmitted in accordance with the further timing.

As a general rule, in case the method of FIG. 15 is executed at the BS, it is possible that the BS does not inform the core NW, e.g., a mobility-control node triggering core NW-initiated paging, of the new timing. In particular, a core-NW UE context at the CN may not be altered. Accordingly, knowledge of a corresponding paging identity—or, generally, the further POs to be used for the multi-SIM identity—may be limited to the radio access NW, e.g., exchanged between neighboring BSs without CN-involvement. Alternatively or additionally, it would also be possible that the BS informs the core NW of the further timing of the further POs. The CN could then inform multiple BSs in a tracking area about the paging identity, or—more generally—the further POs to be used for the UE. The CN could hold the paging identity in a UE context. This is applicable to the message 3009 of FIG. 14.

Figure 16:
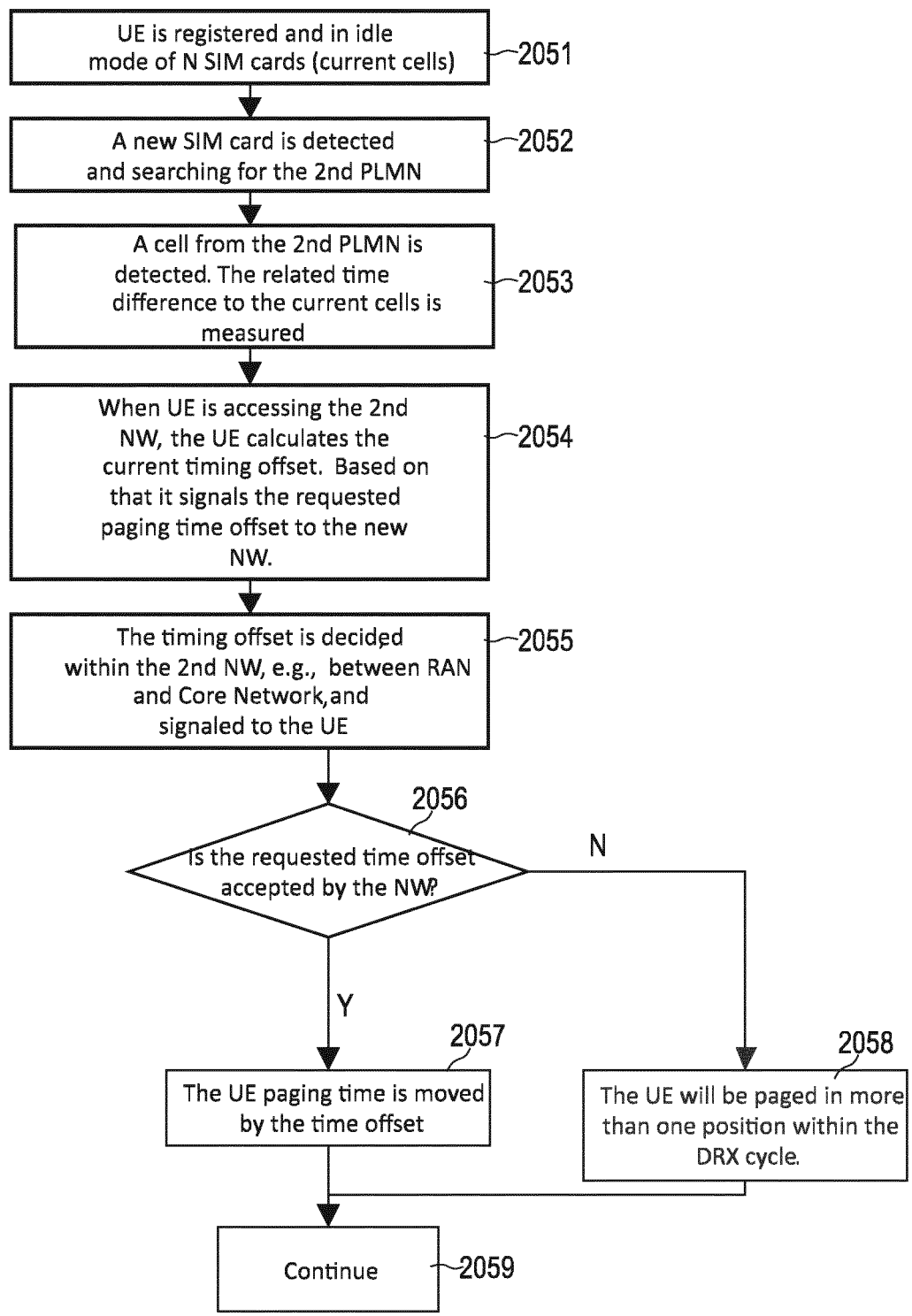
FIG. 16 is a flowchart of a method according to various examples.

FIG. 16 is a flowchart of a method according to various examples. FIG. 16 illustrates activities executed by, both, a UE—e.g., the UE 101 —, as well as by a NW node of a NW, e.g., the BS 112-2 of the second cellular NW 100-2, or a core NW mobility-control node such as the AMF 131 of the second cellular NW 100-2.

At box 2051, the multi-SIM UE 101 (at this point already registered with the first cellular NW 100-1) operates, e.g., in the idle mode 302 towards the first cellular NW 100-1, using a first identity 451. The multi-SIM 101 UE could also operate in the connected mode 301 (not illustrated in FIG. 16). The first identity 451 defines a first timing of first POs 396-1 of the first cellular NW 100-1, e.g., according to Rules 1 and 2, see above. The first identity 451 may be determined by a US IM card or an eSIM.

As a general rule, there could be more than one identity; e.g., there could be two or three identities according to which the UE 101 operates, e.g., in the idle mode 302 towards respective networks (N=1, 2, . . . in FIG. 16).

Then, at box 2052, a further—e.g., second— USIM card or eSIM is detected. The further SIM card is associated with a second identity 452. Then, a NW search mode 303 is executed. This can include receiving synchronization signals 3001 from the BS 112-2 of the second cellular NW 100-2. It would be possible to determine differences in the timing between the first cellular NW 100-1 and the second cellular NW 100-2 at box 2053.

At box 2054, the UE accesses the second cellular NW 100-2, e.g., attempts to establish the respective data connection 189.

At box 2054, the UE also determines the timing offset 780-1 between the first timing of the first POs 396-1 and a second timing of second POs 396-2 that are determined based on the second identity 452, e.g., using Rule 1 and Rule 2 as given above. The UE 101, as part of the attach procedure to establish the data connection 189, then transmits a request control message to the second cellular NW 100-2 (cf. FIG. 14: request control message 3002). This is based on the determined timing offset 780-1. For example, the request control message could be indicative of the timing offset 780-1 and/or other parameters derived from the determined timing offset 780-1 (cf. Table 2 for a few examples, wherein other scenarios are possible).

At box 2055, the NW node—e.g., the BS 112-2 or the AMF 131 of the second cellular NW 100-2—then determines a further timing of further POs of the second cellular NW 100-2 or acknowledges the further timing (if already indicated by the UE as part of box 2054, cf. Table 2). It is possible, but not necessary that the core NW is involved in this process.

A response control message associated with the previously received request control message is then transmitted to the UE 101, including a result of the determination made at box 2055 (cf. FIG. 14, response control message 3003).

Then, at box 2056, the UE 101 determines, based on the determination made at box 2055, whether the second cellular NW 100-2 accepts or declines the request for coordination of the paging. In case the request is accepted, then box 2057 is executed; here, the UE 101 monitors for paging signals from the second NW in accordance with the further timing of the further POs and, for paging signals from the first NW, in accordance with the first timing of the first POs of the first NW. Otherwise, box 2058, the UE 101 monitors for paging signals from the second NW in accordance with the second timing of the second POs and, for paging signals from the first NW, in accordance with the first timing of the first POs of the first NW.

At box 2059, legacy techniques to establish a data connection 189 to the first cellular NW 100-1 and/or the second cellular NW 100-2 can be implemented, in case a respective paging signal is received.

Summarizing, above, techniques have been described of a multi-SIM UE determining a timing offset between POs of multiple NWs, the POs being determined based on the multiple identities of the UEs. For example, when the UE registers to a cell belonging to a second cellular NW, the UE detects or calculates the timing offset between the second timing of the second POs in the second NW (determined based on the second identity, e.g., according to Rule 1 and 2) and the first timing of the first POs of the cell of the first cellular NW (determined based on the first identity, e.g., according to Rule 1 and 2).

The UE either reports that timing offset to RAN of the new cell of the second NW or to the CN of the second NW directly. If reported to the RAN, the RAN may report it to the CN or, in case of RAN-based paging, the RAN may process the reported timing offset locally. The reporting may be part of an attach procedure to the second NW.

The CN (in case of idle mode) or the RAN (in case of idle mode or inactive mode) signals the new further timing of the further POs of the second NW, based on the reported timing offset, to the UE. The UE then monitors for paging signals in accordance with the further timing.

Thereby, the power consumption of a multi-SIM UE can be significantly reduced.

Summarizing, various techniques are based on the finding that—to efficiently reduce the power consumption, the UE operational mode is transitioned to idle or inactive, e.g., as soon as there is no active transmission. During the time the UE is in the idle mode or the inactive mode, a remaining source of power consumption results from the needs to transition the receiver an active state to monitor for paging signals, to thereby determine if the network has any DL data buffered for transmission to the UE. The actual power consumption to monitor for paging signals is low if compared to the power consumption required to transition the modem into the active state or even the power consumption to keep a clock active to determine when and where to listen. According to reference techniques, the UE is required to perform such tasks independently. To mitigate such problem, the paging is coordinated between the multiple identities, according to various examples. In particular, a timing offset between paging from multiple NWs is reduced.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various techniques have been described in the context of coordinating paging when the UE operates in an idle mode towards at least one cellular NW using multiple identities. Similar techniques may also be applicable when using a DRX cycle in other modes. As a first example, it would be possible to employ the techniques described herein in a connected mode employing a DRX cycle. Here, the data connection between the at least one cellular NW and the multi-SIM UE may be maintained, at least for one of the multiple identities. Then, a random-access procedure is not required. Also, paging signals may not be required. Rather, at the respective occasions, the cellular NW may directly transmit data, e.g., on PDSCH. As a second example, there may be an inactive mode in which the paging is handled by the RAN; the UE context at the CN, e.g., the AMF, may not be different for the inactive mode than for the connected mode. Also, when operating the UE in the inactive mode, there may be a benefit from the techniques described herein. In particular, the coordination of the POs may be handled by the radio access NW in the inactive mode, e.g., without involving the CN.

For further illustration, various techniques have been described in the context of an attach procedure to a second NW. As part of the attach procedure, the UE can determine the timing offset between the first timing of the first POs of the first NW and the second timing of the second POs of the second NW. However, the techniques described herein are not limited to the context of the attach procedure. Other trigger criteria for executing the determination of the timing offset or the request for coordination are conceivable. For example, a further trigger criterion would be a cell re-selection, e.g., in idle mode, or a handover. In case there is a cell re-selection to a new serving cell of the second NW, this can have various impact on the POs: When the second NW, for which the UE has performed a cell reselection, is SFN synchronized across its cells, the timing of the second POs based on the second identity is unchanged, therefore the timing offset between the first timing of the first POs of the first NW and the second timing of the second POs of the second NW remains unchanged. When the RAN or the CN stores the timing offset and/or the further timing of the further POs (e.g., in the UE context, cf. FIG. 1: UE context 459), the same timing offset or further timing can be signaled to the new cell without any UE impact. In case the cells of the second NW are not frame synchronized, the CN has the information of the timing offset between the cells of the second NW and can calculate the new offset to the new cell. For this, the further timing can be read from the UE context at the CN. Thereby, the paging can be coordinated in multiple cells. The paging can also be coordinated when doing cell reselection. This is possible even without the UE having to re-report the desired further timing when mobility occurs.

For still further illustration, various techniques have been described in which the multi-SIM UE connects to multiple NWs. Similar techniques could be applied in case the multi-SIM UE connects to a single NW using multiple identities.

For still further illustration, various techniques have been described in which the timing of paging from multiple networks is coordinated in such a manner that a timing offset between respective POs is reduced by the coordination. This helps to reduce a power consumption at the multi-SIM UE, as explained in detail above. Similar techniques regarding the coordination of the timing—e.g., by using a paging identity, indicating the current timing offset and/or a desired further timing offset, transmitting a request control message, receiving a response control message, negotiating a further timing offset between the multi-SIM UE and the cellular NW, handling the further timing of further POs of a cellular NW using a core-network UE context and/or RAN-based signaling, e.g., in case of UE mobility, the configuration of the messages 3001, 3002 according to Table 2, etc. —are also applicable to a scenario in which the timing of paging from the multiple NWs is coordinated in such a manner that the timing offset between respective POs is increased by the coordination. This can help to mitigate limitations imposed by the hardware capability, e.g., for a single-radio multi-SIM UE.

The invention claimed is:

1. A method of operating a wireless communication device comprising a wireless interface having a capability to use a first identity and a second identity, the method comprising:
determining a timing offset between a first timing of first paging occasions of a first network associated with the first identity and a second timing of second paging occasions of a second network associated with the second identity, and
based on the timing offset, transmitting at least one request control message to at least one of the first network or the second network, to request a timing coordination of paging from the first network and paging from the second network.

2. The method of claim 1,
wherein the at least one request control message is transmitted to request a further timing of further paging occasions of the second network,
wherein a further timing offset between the first timing of the first paging occasions and the further timing of the further paging occasions is smaller than the timing offset.

3. The method of claim 1,
wherein the at least one request control message is indicative of whether the timing coordination is requested to reduce or increase the timing offset.

4. The method of claim 1, further comprising:
receiving, from the at least one of the first network or the second network, at least one response control message associated with the at least one request control message,
wherein the at least one response control message grants a further timing of further paging occasions of the second network, the further timing being coordinated with the first timing, or wherein the at least one response control message grants a further timing of further paging occasions of the first network, the further timing being coordinated with the second timing.

5. The method of claim 4,
wherein a further timing offset between the first timing and the further timing is smaller than the timing offset.

6. The method of claim 4,
wherein the further timing offset is determined with respect to at least one of a lower timing tolerance or an upper timing tolerance associated with a hardware capability of a modem of the wireless interface.

7. The method of claim 4,
wherein the first paging occasions and the further paging occasions are arranged within the same or adjacent transmission subframes of transmission protocols of the wireless links of the first network and the second network.

8. The method of claim 4, further comprising:
transitioning a wireless interface of the wireless communication device from an inactive state to an active state, during the active state: monitoring the first paging occasions for first paging signals from the first network and monitoring the further paging occasions for second paging signals from the second network before transitioning back into the inactive state.

9. The method of claim 1, further comprising:
determining a further identity based on the timing offset,
wherein the further identity is associated with a further timing of further paging occasions of the second network,
wherein the at least one request control message is indicative of the further identity.

10. The method of claim 1,
wherein the at least one request control message is indicative of the timing offset, optionally expressed in a protocol time base of the at least one of the first network or the second network.

11. The method of claim 1,
wherein the at least one request control message is indicative of at least one of a lower timing tolerance or an upper timing tolerance for timing coordination of paging,
wherein the at least one of the lower timing tolerance or upper timing tolerance is associated with a hardware capability of a modem of the wireless interface.

12. The method of claim 1,
wherein the at least one request control message is indicative of a hardware capability of a modem of the wireless interface to receive multiple paging signals contemporaneously and/or on multiple frequencies.

13. The method of claim 1,
wherein the at least one request control message is transmitted during an attach procedure to the second network.

14. The method of claim 1,
wherein the timing offset is determined in response to a cell re selection of cells of the second network depending on whether or not there is a synchronization between the cells of the second network.

15. The method of claim 1,
wherein the timing offset is determined upon an accumulated timing drift between the first network and the second network exceeding a threshold or in accordance with a predefined schedule.

16. A method of operating a network node of a second network, the method comprising:
receiving, from a wireless communication device, at least one request control message to request a coordination of paging from a first network and paging from the second network, the at least one request control message being associated with a timing offset between a first timing of first paging occasions of the first network associated with a first identity of the wireless communication device and a second timing of second paging occasions of the second network associated with a second identity of the wireless communication device, and
selectively transmitting at least one response control message associated with the at least one request control message to the wireless communication device,
wherein the at least one response control message grants a further timing of further paging occasions of the second network, the further timing being coordinated with the first timing.

17. The method of claim 16, further comprising:
in response to mobility of the wireless communication device from a first cell of the second network to a second cell of the second network: adjusting the further timing of the further paging occasions of the second network based on a timing advance of the first cell with respect to the second cell.

18. A wireless communication device comprising a wireless interface having a capability to use a first identity and a second identity and comprising a control circuitry configured to:
- determine a timing offset between a first timing of first paging occasions of a first network associated with the first identity and a second timing of second paging occasions of a second network associated with the second identity, and
- based on the timing offset, transmit at least one request control message to at least one of the first network or the second network, to request a timing coordination of paging from the first network and paging from the second network.

* * * * *